United States Patent
Yang et al.

(10) Patent No.: US 11,082,195 B2
(45) Date of Patent: Aug. 3, 2021

(54) PUCCH RESOURCE ALLOCATION AND FALLBACK OPERATION

(71) Applicant: Telefonaktiebolaget LM Ericsson (publ), Stockholm (SE)

(72) Inventors: Yu Yang, Solna (SE); Daniel Larsson, Lund (SE); Shaohua Li, Beijing (CN); Fredrik Lindqvist, Järfälla (SE); Xinghua Song, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/385,900

(22) Filed: Apr. 16, 2019

(65) Prior Publication Data

US 2019/0253233 A1 Aug. 15, 2019

Related U.S. Application Data

(63) Continuation of application No. 15/082,328, filed on Mar. 28, 2016, now Pat. No. 10,305,668.

(30) Foreign Application Priority Data

Apr. 9, 2015 (WO) ................ PCT/CN2015/076176

(51) Int. Cl.
*H04L 5/14* (2006.01)
*H04L 5/00* (2006.01)
*H04L 27/00* (2006.01)

(52) U.S. Cl.
CPC ............ *H04L 5/1415* (2013.01); *H04L 5/001* (2013.01); *H04L 5/0053* (2013.01); *H04L 5/0055* (2013.01); *H04L 5/0058* (2013.01); *H04L 27/0006* (2013.01)

(58) Field of Classification Search
None
See application file for complete search history.

(56) References Cited

U.S. PATENT DOCUMENTS

| 9,014,097 | B2 | 4/2015 | Ahn et al. |
| 9,756,617 | B2 | 9/2017 | Baldemair et al. |
| 2012/0039280 | A1 | 2/2012 | Chen et al. |
| 2012/0087254 | A1 | 4/2012 | Yin et al. |
| 2012/0300741 | A1 | 11/2012 | Han et al. |

(Continued)

FOREIGN PATENT DOCUMENTS

| CN | 101917766 A | 12/2010 |
| CN | 102281593 A | 12/2011 |

(Continued)

OTHER PUBLICATIONS

Notification of Reason for Refusal for Korean Patent Application No. 10-2017-7032192, dated Jun. 24, 2019, 10 pages.

(Continued)

*Primary Examiner* — Rebecca E Song
(74) *Attorney, Agent, or Firm* — Withrow & Terranova, PLLC

(57) ABSTRACT

Systems and methods are disclosed herein that relate to resource allocation and/or fallback operation for an uplink control channel format, e.g., that supports feedback (e.g., Hybrid Automatic Repeat Request (HARQ) Acknowledgement (ACK) (HARQ-ACK) feedback) for up to a large number (e.g., thirty-two) carriers.

18 Claims, 21 Drawing Sheets

(56) References Cited

U.S. PATENT DOCUMENTS

| | | | |
|---|---|---|---|
| 2013/0114532 A1 | 5/2013 | Choi et al. | |
| 2013/0195063 A1 | 8/2013 | Ahn et al. | |
| 2013/0195066 A1* | 8/2013 | Lee | H04W 36/0072 370/329 |
| 2013/0223301 A1* | 8/2013 | Lee | H04W 72/042 370/281 |
| 2013/0272258 A1 | 10/2013 | Lee et al. | |
| 2013/0301571 A1 | 11/2013 | Sorrentino et al. | |
| 2014/0119284 A1 | 5/2014 | Baldemair et al. | |
| 2014/0233419 A1 | 8/2014 | Cheng et al. | |
| 2015/0092702 A1* | 4/2015 | Chen | H04W 72/082 370/329 |
| 2015/0195830 A1 | 7/2015 | Takeda et al. | |
| 2015/0208403 A1 | 7/2015 | Takeda et al. | |
| 2016/0036578 A1 | 2/2016 | Malladi et al. | |
| 2016/0226644 A1 | 8/2016 | Gaal et al. | |
| 2016/0295561 A1* | 10/2016 | Papasakellariou | H04L 5/0094 |
| 2016/0295573 A1 | 10/2016 | Lee | |
| 2016/0295574 A1 | 10/2016 | Papasakellariou | |
| 2016/0302183 A1 | 10/2016 | Yang et al. | |
| 2016/0316457 A1* | 10/2016 | Lan | H04L 1/1861 |
| 2016/0345199 A1 | 11/2016 | Nogami et al. | |
| 2017/0006491 A1 | 1/2017 | Chen et al. | |
| 2017/0366380 A1* | 12/2017 | Hwang | H04W 72/0413 |
| 2018/0019851 A1* | 1/2018 | Takeda | H04W 72/042 |
| 2018/0027547 A1* | 1/2018 | Lyu | H04W 72/0413 370/329 |
| 2018/0062796 A1* | 3/2018 | Feng | H04L 1/1812 |

FOREIGN PATENT DOCUMENTS

| | | |
|---|---|---|
| CN | 102315910 A | 1/2012 |
| CN | 102437901 A | 5/2012 |
| EP | 2637341 A2 | 9/2013 |
| KR | 20120041659 A | 5/2012 |

OTHER PUBLICATIONS

Author Unknown, "Technical Specification Group Radio Access Network; Evolved Universal Terrestrial Radio Access (E-UTRA); Physical channels and modulation (Release 13)," Technical Specification 36.211, Version 13.0.0, 3GPP Organizational Partners, Dec. 2015, 141 pages.

Author Unknown, "Technical Specification Group Radio Access Network; Evolved Universal Terrestrial Radio Access (E-UTRA); Physical layer procedures (Release 12)," Technical Specification 36.213, Version 12.5.0, 3GPP Organizational Partners, Mar. 2015, 239 pages.

Huawei et al., "R1-150390: On CA enhancements supporting up to 32 component carriers," Third Generation Partnership Project (3GPP) TSG RAN WG1 Meeting #80, Feb. 9-13, 2015, Athens, Greece, 9 pages.

Nokia Networks, et al., "R1-150454: PUCCH Enhancements for Carrier Aggregation Enhancement Beyond 5 Carriers," Third Generation Partnership Project (3GPP) TSG-RAN WG1 Meeting #80, Feb. 9-13, 2015, Athens, Greece, 5 pages.

Nokia Networks, et al., "R1-157802: Summary of agreements for LTE_CA_enh b5C after RAN1 #83," 3rd Generation Partnership Project (3GPP), TSG RAN WG1 Meeting #83, Nov. 1-22, 2015, 14 pages, Anaheim, USA.

Non-Final Office Action for U.S. Appl. No. 15/082,328, dated Aug. 21, 2017, 8 pages.

Non-Final Office Action for U.S. Appl. No. 15/082,328, dated Dec. 18, 2017, 9 pages.

Final Office Action for U.S. Appl. No. 15/082,328, dated Apr. 20, 2018, 13 pages.

Advisory Action and Examiner-Initiated Interview Summary for U.S. Appl. No. 15/082,328, dated Jul. 19, 2018, 6 pages.

Non-Final Office Action for U.S. Appl. No. 15/082,328, dated Aug. 24, 2018, 12 pages.

Notice of Allowance for U.S. Appl. No. 15/082,328, dated Jan. 14, 2019, 10 pages.

First Office Action for Japanese Patent Application No. 2017-552998, dated Nov. 12, 2018, 7 pages.

Decision to Grant for Japanese Patent Application No. 2017-552998, dated May 20, 2019, 5 pages.

International Search Report and Written Opinion for PCT/CN2015/076176, dated Mar. 16, 2016, 6 pages.

International Search Report and Written Opinion for PCT/IB2016/051983, dated Jun. 13, 2016, 11 pages.

Search Report for Chinese Patent Application No. 201680034078.2, dated Mar. 3, 2020, 2 pages.

First Office Action for Chinese Patent Application No. 201680034078.2, dated Mar. 16, 2020, 12 pages.

Decision to Grant for Korean Patent Application No. 10-2017-7032192, dated Feb. 7, 2020, 7 pages.

* cited by examiner

PUCCH RESOURCE ALLOCATION AND FALLBACK OPERATION

RELATED APPLICATIONS

This application is a continuation of U.S. patent application Ser. No. 15/082,328, filed Mar. 28, 2016, now U.S. Pat. No. 10,305,668, which claims the benefit of Patent Cooperation Treaty (PCT) patent application serial number PCT/CN2015/076176, filed Apr. 9, 2015, the disclosures of which are hereby incorporated herein by reference in their entireties.

TECHNICAL FIELD

The present disclosure relates to an uplink control channel in a cellular communications network.

BACKGROUND

Carrier Aggregation (CA)

The use of Third Generation Partnership Project (3GPP) Long Term Evolution (LTE) CA, which was introduced in Release 10 (Rel-10) and enhanced in Release 11 (Rel-11), offers a means to increase peak data rates, increase system capacity, and improve user experience by aggregating radio resources from multiple carriers that may reside in the same band or different bands and, for the case of inter-band Time Division Duplexing (TDD) CA, may be configured with different Uplink/Downlink (UL/DL) configurations. In Release 12 (Rel-12), CA between TDD and Frequency Division Duplexing (FDD) serving cells is introduced to support a User Equipment device (UE) connecting to the TDD and FDD serving cells simultaneously.

In Release 13 (Rel-13), Licensed Assisted Access (LAA) has attracted a lot of interest in extending the LTE CA feature towards capturing the spectrum opportunities of unlicensed spectrum in the 5 Gigahertz (GHz) frequency band. Wireless Local Area Networks (WLANs) operating in the 5 GHz band that are currently in the field already support a bandwidth of 80 Megahertz (MHz). Further, support for a bandwidth of 160 MHz is to follow in Wave 2 deployment of IEEE 802.11ac. There are also other frequency bands, such as the 3.5 GHz frequency band, where aggregation of more than one carrier on the same band is possible, in addition to the bands already widely in use for LTE. Enabling the utilization of at least similar bandwidths for LTE in combination with LAA as IEEE 802.11ac Wave 2 will support calls for extending the LTE CA framework to support more than five carriers. The extension of the LTE CA framework beyond five carriers was approved to be one work item for LTE Rel-13. The objective is to support up to thirty-two (32) carriers in both UL and DL.

One example of CA is illustrated in FIG. 1. As illustrated, multiple carriers (referred to as Component Carriers (CCs)) are aggregated. In this example, a Primary Cell (PCell) and a Secondary Cell (SCell) are configured for a UE. The PCell includes, in this example, a UL CC and a DL CC (i.e., the PCell, in this example, is an FDD PCell), where the UL CC and the DL CC are, e.g., in a licensed frequency spectrum/band. The SCell includes, in this example, a corresponding CC, which in this example is illustrated as a DL CC, where the CC of the SCell is, e.g., in an unlicensed frequency spectrum/band. Such a configuration may exist, for example, when using LAA. Note that the example of FIG. 1 is only an example. For instance, while there are three CCs configured for the UE in this example, as discussed above, there is a desire to support up to thirty-two (32) CCs.

Compared to single-carrier operation, a UE operating with CA has to report feedback for more than one DL CC. Meanwhile, a UE does not need to support DL and UL CA simultaneously. For instance, the first release of CA capable UEs in the market only supports DL CA but not UL CA. This is also the underlying assumption in the 3GPP Radio Access Network 4 (RAN4) standardization. Therefore, an enhanced UL control channel, i.e. Physical UL Control Channel (PUCCH) format 3, was introduced for CA during the Rel-10 timeframe. However, in order to support more CCs in Rel-13, the UL control channel capacity becomes a limitation.

PUCCH Format 3

In LTE Release 8 (Rel-8), PUCCH format 1/1a/1b and PUCCH format 2/2a/2b are supported for Scheduling Request (SR), Hybrid Automatic Repeat Request (HARQ) Acknowledgment (ACK) (HARQ-ACK), and periodic Channel State Information (CSI) reporting. The PUCCH resource (i.e., the resource on which the PUCCH is transmitted by the UE) is represented by a single scalar index, from which the phase rotation and the orthogonal cover sequence (only for PUCCH format 1/1a/1b) are derived. The use of a phase rotation of a cell-specific sequence together with orthogonal sequences provides orthogonally between different terminals in the same cell transmitting PUCCH on the same set of resource blocks. In LTE Rel-10, PUCCH format 3 was introduced for carrier aggregation, when there are multiple downlink transmissions (either on multiple carriers or multiple downlink subframes in TDD) but single uplink (either single carrier or single uplink subframe) for HARQ-ACK, SR, and CSI feedback.

Similarly, the PUCCH format 3 resource is also represented by a single scalar index, $n_{PUCCH}^{(3)}$, from which the orthogonal sequence (represented by a cyclic shift $n_{oc,0}$ for a predefined base sequence for slot 0 and a cyclic shift of $n_{oc,0}$ for the predefined base sequence for slot 1) and the resource block number, m, can be derived. A length-5 orthogonal sequence is applied for PUCCH format 3 to support code multiplexing within one resource block pair (see 3GPP TS 36.211 V13.0.0) and a length-4 orthogonal sequence is applied for shorted PUCCH. Based on the scalar index, $n_{PUCCH}^{(3)}$, for the PUCCH format 3 resource, the resource block of the PUCCH format 3 resource m is determined by the following $$m = \lfloor n_{PUCCH}^{(3)} / N_{SF,0}^{PUCCH} \rfloor$$

where $N_{SF,0}^{PUCCH}$ is the length of the orthogonal sequence for slot 0.

The orthogonal sequences applied for the two slots are derived by the following:

$$n_{oc,0} = n_{PUCCH}^{(3)} \bmod N_{SF,1}^{PUCCH}$$

$$n_{oc,1} = \begin{cases} (3n_{oc,0}) \bmod N_{SF,1}^{PUCCH} & \text{if } N_{SF,1}^{PUCCH} = 5 \\ n_{oc,0} \bmod N_{SF,1}^{PUCCH} & \text{otherwise} \end{cases}$$

where $N_{SF,1}^{PUCCH}$ is the length of the orthogonal sequence for slot 1, where $N_{SF,0}^{PUCCH} = N_{SF,1}^{PUCCH} = 5$ holds for both slots in a subframe using normal PUCCH format 3 while $N_{SF,0}^{PUCCH} = N_{SF,1}^{PUCCH} = 4$ holds for the first slot and second slot in a subframe using shortened PUCCH format 3.

The PUCCH format 3 resource is determined according to higher layer configuration and a dynamic indication from the DL assignment. In detail, the Transmit Power Control (TPC) field in the DL Control Information (DCI) format of the corresponding Physical DL Control Channel (PDCCH)/Enhanced PDCCH (EPDCCH) is used to determine the PUCCH resource value from one of the four resource values configured by higher layers, with the mapping defined in Table 1 below (see 3GPP TS 36.211 V13.0.0). For FDD, the TPC field corresponds to the PDCCH/EPDCCH for the scheduled secondary serving cells. For TDD, the TPC field corresponds to the PDCCH/EPDCCH for the PCell with a DL Assignment Indicator (DAI) value in the PDCCH/EPDCCH larger than '1.' A UE assumes that the same PUCCH resource values are transmitted in each DCI format of the corresponding PDCCH/EPDCCH assignments.

TABLE 1

PUCCH Resource Value for HARQ-ACK Resource for PUCCH

| Value of 'TPC command for PUCCH' or 'HARQ-ACK resource offset' | $n_{PUCCH}^{(3,\tilde{p})}$ |
|---|---|
| '00' | The 1st PUCCH resource value configured by the higher layers |
| '01' | The $2^{nd}$ PUCCH resource value configured by the higher layers |
| '10' | The $3^{rd}$ PUCCH resource value configured by the higher layers |
| '11' | The $4^{th}$ PUCCH resource value configured by the higher layers |

New PUCCH Format to Support Up to 32 DL CCs

In 3GPP up to Rel-12, the maximum number of DL CCs is five (5). PUCCH format 1b with channel selection and PUCCH format 3 are introduced for HARQ feedback and corresponding fallback operations are defined. As used herein, fallback operation is the operation to fall back from one PUCCH format to another PUCCH format (e.g., fall back from PUCCH format 3 to PUCCH format 1a/1b in the event that only two feedback bits are required). Fallback operation is beneficial not only from the HARQ-ACK performance perspective but is also useful for a UE during the RRC (re)configuration period to avoid ambiguity between the eNB and the UE. However, in Rel-13, a maximum of 32 DL CCs can be configured for one UE and, therefore, a new PUCCH format will be introduced to carry more HARQ-ACK bits due to the aggregation of up to 32 DL CCs.

There are four design options to support larger payload size on PUCCH:
Option 1: PUCCH format 3 with multiple Physical Resource Blocks (PRBs)
Option 2: PUCCH format 3 with multiple Orthogonal Cover Codes (OCCs)
Option 3: PUCCH format 3 with both multiple PRBs and OCCs
Option 4: PUSCH-like structure PUCCH Format Fallback PUCCH format 1 b with channel selection and PUCCH format 3 are introduced in 3GPP Rel-10 to support HARQ-ACK feedback with CA. PUCCH fallback operation is also introduced for both PUCCH format 1b with channel selection and PUCCH format 3 in a specific condition.

PUCCH format 1 b with channel selection involves configuring up to four (4) PUCCH format 1b resources (also referred to as "channels"). The selection of one of these resources indicates some of the ACK/Negative ACK (NACK) information to be conveyed. There are mapping tables specified for the cases of two, three, or four ACK/NACK bits to define the mapping of ACK/NACK combinations to the configured PUCCH resources. These tables are designed to support fallback to Rel-8 operation. More specifically, in the case of a single scheduled carrier, i.e. PCell, 1 or 2 ACK/NACK bits will be transmitted by PUCCH format 1a/1b as in Rel-8.

Similarly for PUCCH format 3, if no (E)PDCCH corresponding to Physical Downlink Shared Channel (PDSCH) on SCells is received and PDSCH is received on the PCell, 1 or 2 ACK/NACK bits will be transmitted by PUCCH format 1a/1b as in Rel-8. For TDD, when PDSCH is only received from the PCell in one DL subframe where the DAI value is set to '1,' PUCCH format 1a/1b is used for HARQ-ACK transmission.

Problems

As discussed above, in 3GPP Rel-13, a maximum of thirty-two (32) DL CCs can be configured for one UE and, therefore, a new PUCCH format will be introduced. Several design options are of great interest as described above. However, it is not clear how to do PUCCH resource allocation and fallback operation for the new PUCCH format, if the options mentioned above are adopted. As such, there is a need for systems and methods for PUCCH resource allocation and fallback operation for the new PUCCH format.

SUMMARY

Systems and methods are disclosed herein that relate to resource allocation and/or fallback operation for an Uplink (UL) control channel format, e.g., that supports feedback (e.g., Hybrid Automatic Repeat Request (HARQ) Acknowledgement (ACK) (HARQ-ACK) feedback) for up to a large number (e.g., thirty-two) carriers. In some embodiments, a method of operation of a wireless device in a cellular communications network to transmit UL control information for one or more carriers on a UL control channel comprises transmitting a UL control channel transmission using a first UL control channel format if a first set of one or more conditions for the first UL control channel format is satisfied. The method further comprises transmitting the UL control channel transmission using a second UL control channel format if the first set of one or more conditions for the first UL control channel format is not satisfied but a second set of one or more conditions for the second UL control channel format is satisfied. The method further comprises transmitting the UL control channel transmission using a third UL control channel format if both the first set of one or more conditions for the first UL control channel format and the second set of one or more conditions for the second UL control channel format are not satisfied. In this manner, fallback operation is provided for the third UL control channel format, which may be a new or enhanced control channel format that supports feedback for up to a large number (e.g., thirty-two) of carriers.

In some embodiments, the cellular communications network is a Third Generation Partnership Project (3GPP) network, the first UL control channel format is format 1a/1b, and the second UL control channel format is format 3.

In some embodiments, the third UL control channel format is a UL control channel format that uses a Physical UL Shared Channel (PUSCH) structure. In other embodiments, the third UL control channel format is a UL control channel format that uses legacy format 3 over multiple Physical Resource Blocks (PRBs), legacy format 3 over a single PRB with multiple Orthogonal Cover Codes (OCCs), legacy format 3 over multiple PRBs with multiple OCCs, a modified format 3 with Tail-Biting Convolutional Code (TBCC) over multiple PRBs, a modified format 3 with TBCC over a single PRB with multiple OCCs, or a modified format 3 with TBCC over multiple PRBs with multiple OCCs.

In some embodiments, the second set of one or more conditions for the second UL control channel format comprises a condition that a required number of feedback bits for the UL control channel transmission is less than or equal to a threshold, $M_2$.

In some embodiments, the threshold, $M_2$, is equal to 22.

In some embodiments, the first set of one or more conditions for the first UL control channel format comprises a condition that a required number of feedback bits for the UL control channel transmission is less than or equal to a threshold, $M_1$. Further, in some embodiments, the threshold, $M_1$, is equal to 2 and the threshold, $M_2$, is equal to 22.

In some embodiments, the first set of one or more conditions for the first UL control channel format further comprises a condition that feedback bits are required only for a Primary Cell (PCell) of the wireless device. Further, in some embodiments, the threshold, $M_1$, is equal to 2. In some embodiments, the threshold, $M_2$, is equal to 22.

In some embodiments, the first set of one or more conditions for the first UL control channel format comprise: (a) a condition that feedback bits are required only for a PCell of the wireless device and (b) a required number of feedback bits for the UL control channel format is less than or equal to a threshold, $M_1$. Further, in some embodiments, the threshold, $M_1$, is equal to 2.

In some embodiments, the wireless device is configured with a Frequency Division Duplexing (FDD) PCell according to a Carrier Aggregation (CA) scheme in which the UL control channel is transmitted on the FDD PCell of the wireless device, and the first set of one or more conditions for fallback to format 1a/1b comprises: (a) a condition that no Downlink (DL) control channel corresponding to a DL shared channel on any Secondary Cells (SCells) of the wireless device is received and (b) a condition that a DL shared channel is received on the FDD PCell of the wireless device.

In some embodiments, the wireless device is configured with a Time Division Duplexing (TDD) PCell according to a CA scheme in which the UL control channel is transmitted on the TDD PCell of the wireless device, and the first set of one or more conditions for fallback to format 1a/1b comprises: (a) a condition that no DL control channel corresponding to a DL shared channel on any SCells of the wireless device is received and (b) a condition that a DL shared channel is received on the TDD PCell in only one DL subframe where a DL Assignment Indicator (DAI) value is set to "1."

In some embodiments, the wireless device is configured with a FDD or TDD PCell according to a CA scheme in which the UL control channel is transmitted on the PCell of the wireless device, and the second set of one or more conditions for fallback to format 3 comprises: (a) a condition that the wireless device receives a Physical Downlink Shared Channel (PDSCH) only on cells within a segment of less than or equal to $M_2$ feedback bits in a sequence of N possible feedback bits where $N>M_2$ and (b) a condition that no DL control channel is received by the wireless device on any other cells.

In some embodiments, the wireless device is configured with a FDD Primary Secondary Cell (pSCell) in a cell group according to a CA scheme in which the UL control channel is transmitted on the FDD pSCell, where the FDD pSCell can be either a PCell of the wireless device or one of one or more SCells of the wireless device, and the first set of one or more conditions for fallback to format 1a/1b comprises: (a) a condition that no DL control channel corresponding to a DL shared channel on any SCells in a cell group is received and (b) a condition that a DL shared channel is received on the FDD pSCell.

In some embodiments, the wireless device is configured with a TDD pSCell in a cell group according to a CA scheme in which the UL control channel is transmitted on the TDD pSCell, where the TDD pSCell can be either a PCell of the wireless device or one of one or more SCells of the wireless device, and the first set of one or more conditions for fallback to format 1a/1b comprises: (a) a condition that no DL control channel corresponding to a DL shared channel on any SCells in a cell group is received and (b) a condition that a DL shared channel is received on the TDD pSCell in only one DL subframe where a DAI value is set to "1."

In some embodiments, the wireless device is configured with a FDD or TDD pSCell in a cell group according to a CA scheme in which the UL control channel is transmitted on the pSCell, where the pSCell can be either a PCell of the wireless device or one of one or more SCells of the wireless device, and the second set of one or more conditions for fallback to format 3 comprises: (a) a condition that DL shared channels are received by the wireless device on one or more SCells in a cell group that correspond to a segment of less than or equal to $M_2$ feedback bits in a sequence of N possible feedback bits, where $N>M_2$ and (b) a condition that no DL control channel is received by the wireless device on any other SCells in the cell group.

In some embodiments, the wireless device is configured with a FDD pSCell according to a CA scheme in which the UL control channel is transmitted on the FDD pSCell, where the FDD pSCell is a PCell of the wireless device, and the first set of one or more conditions for fallback to format 1a/1b comprises: (a) a condition that no DL control channel corresponding to a DL shared channel on any SCells in a cell group is received and (b) a condition that a DL shared channel is received on the FDD pSCell.

In some embodiments, the wireless device is configured with a TDD pSCell according to a CA scheme in which the UL control channel is transmitted on the TDD pSCell, where the TDD pSCell is a PCell of the wireless device, and the first set of one or more conditions for fallback to format 1a/1b comprises: (a) a condition that no DL control channel corresponding to a DL shared channel on any SCells in a cell group is received and (b) a condition that a DL shared channel is received on the TDD pSCell in only one DL subframe where a DAI value is set to "1."

Embodiments of a wireless device enabled to operate in a cellular communications network to transmit UL control information for one or more carriers on a UL control channel are also disclosed. In some embodiments, the wireless device comprises one or more transmitters, one or more processors, and memory containing instructions that are executable by the one or more processors whereby the wireless device is operable to: transmit, via the one or more transmitters, a UL control channel transmission using a first UL control channel format if a first set of one or conditions for the first UL control channel format is satisfied; transmit, via the one or more transmitters, the UL control channel transmission using a second UL control channel format if the first set of one or more conditions for the first UL control channel format is not satisfied but a second set of one or more conditions for the second UL control channel format is satisfied; and transmit, via the one or more transmitters, the UL control channel transmission using a third UL control channel format if both the first set of one or more conditions for the first UL control channel format and the second set of one or more conditions for the second UL control channel format are not satisfied.

In other embodiments, a wireless device is adapted to perform any of the embodiments of the method of operation of a wireless device described herein.

In other embodiments, a wireless device enabled to operate in a cellular communications network to transmit UL control information for one or more carriers on a UL control channel comprises a UL control channel transmission module operable to: transmit a UL control channel transmission using a first UL control channel format if a first set of one or conditions for the first UL control channel format is satisfied; transmit the UL control channel transmission using a second UL control channel format if the first set of one or more conditions for the first UL control channel format is not satisfied but a second set of one or more conditions for the second UL control channel format is satisfied; and transmit the UL control channel transmission using a third UL control channel format if both the first second of one or more conditions for the first UL control channel format and the second set of one or more conditions for the second UL control channel format are not satisfied.

In other embodiments, a wireless device enabled to operate in a cellular communications network to transmit UL control information for one or more carriers on a UL control channel comprises: means for transmitting a UL control channel transmission using a first UL control channel format if a first set of one or conditions for the first UL control channel format is satisfied; means for transmitting the UL control channel transmission using a second UL control channel format if the first set of one or more conditions for the first UL control channel format is not satisfied but a second set of one or more conditions for the second UL control channel format is satisfied; and means for transmitting the UL control channel transmission using a third UL control channel format if both the first second of one or more conditions for the first UL control channel format and the second set of one or more conditions for the second UL control channel format are not satisfied.

In some embodiments, a non-transitory computer readable medium storing software instructions that when executed by one or more processors of a wireless device cause the wireless device to: transmit a UL control channel transmission using a first UL control channel format if a first set of one or conditions for the first UL control channel format is satisfied; transmit the UL control channel transmission using a second UL control channel format if the first set of one or more conditions for the first UL control channel format is not satisfied but a second set of one or more conditions for the second UL control channel format is satisfied; and transmit the UL control channel transmission using a third UL control channel format if both the first set of one or more conditions for the first UL control channel format and the second set of one or more conditions for the second UL control channel format are not satisfied.

In some embodiments, a computer program comprises instructions which, when executed on at least one processor, cause the at least one processor to carry out the method of operation of a wireless device according to any of the embodiments described herein. In some embodiments, a carrier is provided, wherein the carrier contains the aforementioned computer program, wherein the carrier is one of an electronic signal, an optical signal, a radio signal, or a computer readable storage medium.

According to one aspect of the present disclosure, methods of resource allocation and fallback operation for the new Physical UL Control Channel (PUCCH) format in 3GPP Release 13 (Rel-13) are proposed.

The resource allocation and fallback solutions in the present disclosure enable the compatibility with existing PUCCH format(s). It is beneficial not only from HARQ-ACK performance perspective but also useful for wireless devices (e.g., User Equipment devices (UEs)) during the RRC (re)configuration period to avoid ambiguity between the eNB and the UE.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
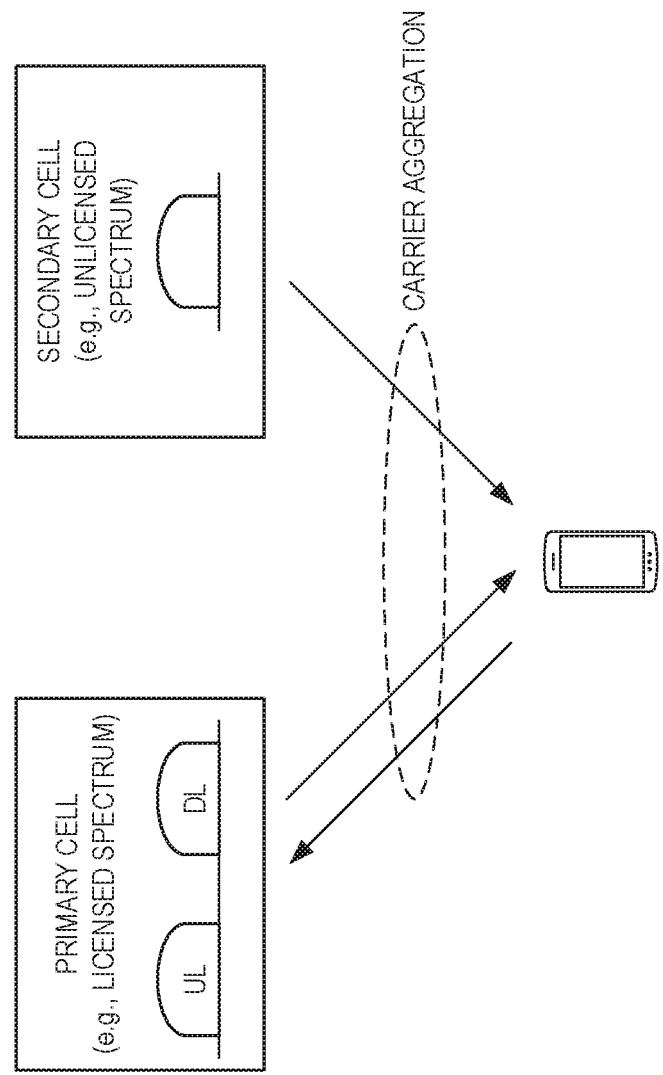
FIG. 1 illustrates one example of Carrier Aggregation (CA)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a Core Network (CN). Some examples of a core network node include, e.g., a Mobility Management Entity (MME), a Packet Data Network (PDN) Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP LTE network and a Machine Type Communication (MTC) device.

Network Node: As used herein, a "network node" is any node that is either part of the radio access network or the CN of a cellular communications network/system.

Note that the description given herein focuses on a 3GPP cellular communications system and, as such, 3GPP LTE terminology or terminology similar to 3GPP LTE terminology is oftentimes used. However, the concepts disclosed herein are not limited to a 3GPP system.

Note that, in the description herein, reference may be made to the term "cell;" however, particularly with respect to Fifth Generation (5G) concepts, beams may be used instead of cells and, as such, it is important to note that the concepts described herein are equally applicable to both cells and beams.

As discussed above, in 3GPP Release 13 (Rel-13), the Carrier Aggregation (CA) feature is extended such that a maximum of thirty-two (32) Downlink (DL) Component Carriers (CCs) can be configured for one UE. Therefore, a new Physical Uplink Control Channel (PUCCH) format that supports Hybrid Automatic Repeat Request (HARQ) Acknowledgement (ACK) (HARQ-ACK) feedback for up to thirty-two (32) CCs will be introduced. Several design options are of great interest, as described in the Background. Systems and methods for PUCCH resource allocation and fallback operation for the new PUCCH format are disclosed herein. Notably, the new PUCCH format is referred to herein as PUCCH format 4 for clarity and ease of discussion. However, PUCCH format 4 is only the name used for the new PUCCH format herein. The new PUCCH format may be given a different name in the 3GPP standards.

Figure 2:
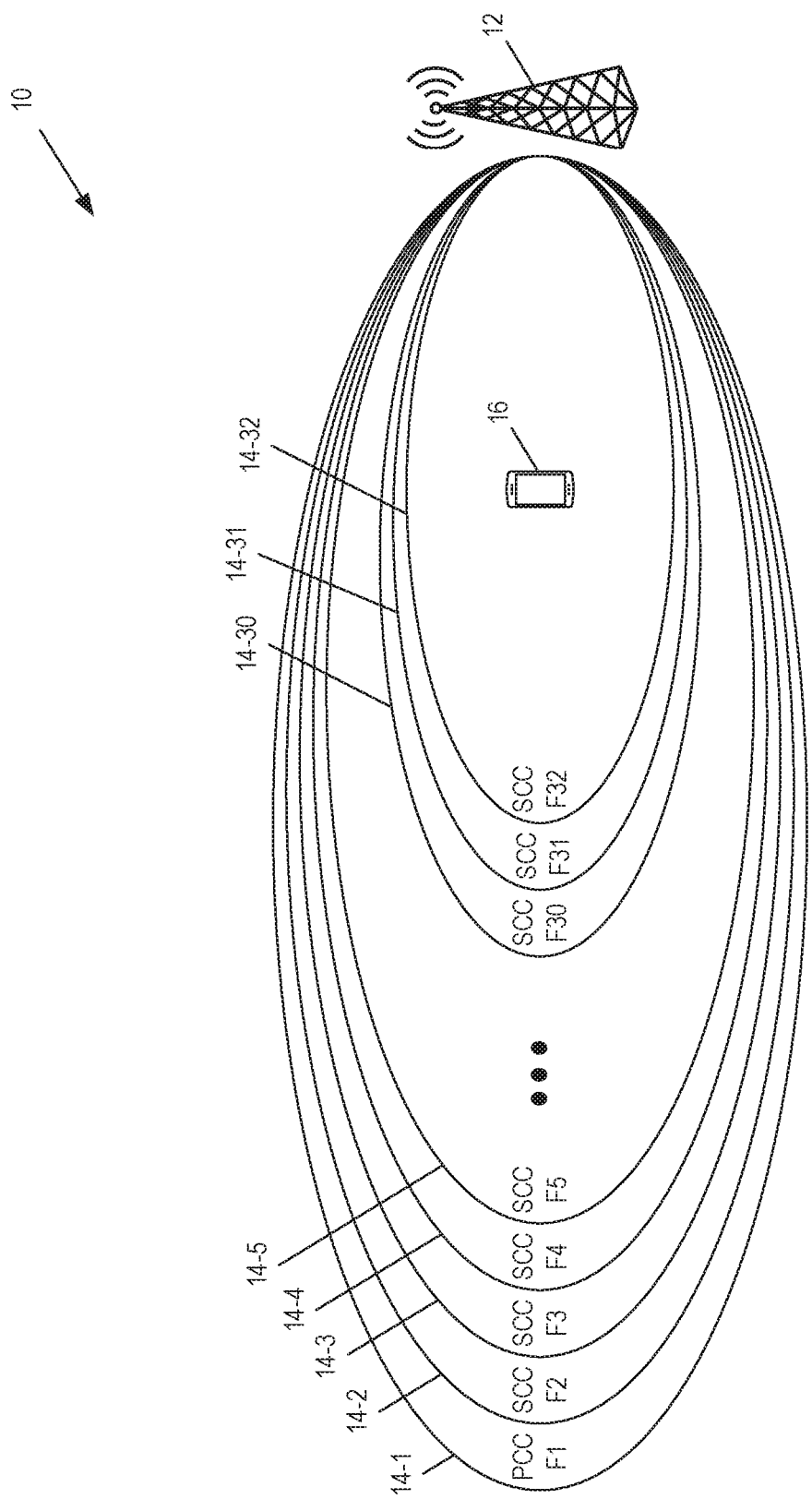
FIG. 2 illustrates one example of a cellular communications network in which resource allocation and fallback operation for a new Physical Uplink Control Channel (PUCCH) format are implemented according to some embodiments of the present disclosure.

In this regard, FIG. 2 illustrates one example of a cellular communications network 10 in which PUCCH format 4 resource allocation and fallback operations are implemented according to some embodiments of the present disclosure. In this example, the cellular communications network 10 is an LTE network (e.g., a License Assisted Access LTE (LAA-LTE) network or a LTE in Unlicensed Spectrum (LTE-U) network) that includes a base station 12, which in LTE is referred to as an eNB, that serves multiple cells 14, each operating on a different carrier. In this particular example, the base station 12 serves up to thirty-two (32) cells, which are referred to generally as cells 14-1 through 14-32, operating on carriers F1 through F32, respectively. In some embodiments, the carriers F1 through F32 are all in a licensed frequency spectrum. However, in other embodiments, some of the carriers F1 through F32 are in a licensed frequency spectrum (i.e., in one or more licensed frequency bands) while other ones of the carriers F1 through F32 are in an unlicensed frequency spectrum (i.e., in one or more unlicensed frequency bands), which would be the case when the cellular communications network 10 is an LAA-LTE network. In other embodiments, all of the carriers F1 through F32 are in an unlicensed frequency spectrum (i.e., in one or more unlicensed frequency bands). Note that while thirty-two cells 14 are illustrated in this example, the base station 12 may serve any number of cells 14 (e.g., any number of one up to 32 cells or potentially even more than 32 cells, depending on, e.g., the particular implementation). In this particular example, a wireless device 16, which in LTE terminology is referred to as a UE, is served by the base station 12. It should also be noted that while the cells 14 are all provided by the same base station 12 in this example, the present disclosure is not limited thereto. The cells 14 may be provided by any number of one or more radio access nodes.

The base station 12, or eNB 12, and the wireless device 16, or UE 16, operate according to a CA scheme in which up to, in this example, thirty-two (32) carriers (referred to as CCs, can be configured for the wireless device 16. In this example, the cell 14-1 is configured as a Primary Cell (PCell) of the wireless device 16 and, as such, the carrier F1 is referred to herein as a Primary CC (PCC). One or more of the other cells 14-2 through 14-32 are configured as Secondary Cells (SCells) of the wireless device 16 and, as such, the respective carriers are referred to herein as Secondary CCs (SCCs).

The wireless device 16 transmits Uplink Control Information (UCI) such as Scheduling Requests (SRs), periodic Channel State Information (CSI), and HARQ-ACKs using PUCCH. When operating according to a DL CA scheme, the wireless device 16 is able to transmit HARQ-ACKs for up to eight (8) cells 14 when using conventional PUCCH formats. The new PUCCH format (referred to herein as PUCCH format 4) extends the PUCCH capacity to support HARQ-ACKs for up to thirty-two (32) cells 14.

I. Design Options for PUCCH Format 4

Currently, there are four design options for PUCCH format 4, namely:
Option 1: PUCCH format 3 (legacy or modified) with multiple Physical Resource Blocks (PRBs)
Option 2: PUCCH format 3 (legacy or modified) with multiple Orthogonal Cover Codes (OCCs)
Option 3: PUCCH format 3 (legacy or modified) with both multiple PRBs and multiple OCCs
Option 4: PUCCH format having a Physical Uplink Shared Channel (PUSCH)-like structure Each of these options along with embodiments of resource allocation for PUCCH format 4 for these design options are described in detail below.

II. Resource Allocation for PUCCH Format 4

The following discussion provides embodiments of resource allocation for each of the different PUCCH format 4 design options.

A. Resource Allocation for PUCCH Format 4 Design Option 1

Design option 1 for PUCCH format 4 is to use legacy PUCCH format 3 or a modified PUCCH format 3 (e.g., PUCCH format 3 with Tail-Biting Convolutional Code (TBCC)) on multiple PRBs to carry more HARQ-ACK bits than is possible with the current, or legacy, PUCCH format 3 (i.e., to carry a number of HARQ-ACK bits that exceeds the capacity of legacy PUCCH format 3).

i. Alternative 1: Use Legacy PUCCH Format 3

In some embodiments, PUCCH format 4 uses the legacy PUCCH format 3 on multiple PRBs. The number of PRBs needed for PUCCH format 4 is denoted as $N_{PUCCH4}$ and calculated by $$N_{PUCCH4} = \left\lceil \frac{O_{ACK}}{q} \right\rceil$$

where $O_{ACK}$ is the number of HARQ-ACK bits in total and q is the maximum number of HARQ-ACK bits that can be carried by one PRB using PUCCH format 3, i.e., q is equal to 22. $O_{ACK}$ can be determined based on the number of scheduled carriers, the number of activated carriers, or the number of configured carriers. Moreover, the number of transport blocks on each carrier and whether HARQ-ACK bundling is applied is also taken into account.

In a manner similar to PUCCH format 3, the PUCCH resource for PUCCH format 4, which is denoted $n_{PUCCH}^{(4)}$, is determined according to higher layer configuration and a dynamic indication from the DL assignment. In some embodiments, based on the PUCCH format 4 resource $n_{PUCCH}^{(4)}$, the resource block numbers of the PUCCH format 4 resource m is determined by the following:

$$m = \lfloor n_{PUCCH}^{(4)}/N_{SF,0}^{PUCCH} \rfloor, \lfloor n_{PUCCH}^{(4)}/N_{SF,0}^{PUCCH} \rfloor+1, \ldots, \lfloor n_{PUCCH}^{(4)}/N_{SF,0}^{PUCCH} \rfloor + N_{PUCCH4}-1$$

where, as mentioned previously, $N_{SF,0}^{PUCCH}$ denotes the length of the orthogonal sequence in the first slot (i.e., slot 0).

In some other embodiments, the resource allocation of PUCCH format 4 is defined directly based on the first configured PUCCH format 4 resource and the length of the orthogonal sequence for the first slots. The wireless device 16 would determine, when transmitting, how many resources it should allocate depending on the number of PUCCH format 4 resources required, which is denoted by $N_{PUCCH4}$. Each resource is defined as follows $$m = \lfloor n_{PUCCH(z)}^{(4)}/N_{SF,0}^{PUCCH} \rfloor z=0,1,\ldots,N_{PUCCH4}-1$$

The orthogonal sequence applied for the two slots is similar to the approach for PUCCH format 3. In one example, the same OCC applies for multiple PRBs. In another example, different OCCs apply for different PRBs following a predefined rule. A principle is that the OCC used for the resource block number with the lowest index should follow exactly the same approach for PUCCH format 3. This is to enable fallback operation.

In some other embodiments, the wireless device 16 is configured by the base station 12 with a set of PUCCH format 4 resources. Each resource is then individually determined, which could for example be as follows:

$$m = \lfloor n_{PUCCH(0)}^{(4)}/N_{SF,0}^{PUCCH} \rfloor, \lfloor n_{PUCCH(1)}^{(4)}/N_{SF,0}^{PUCCH} \rfloor, \ldots, \lfloor n_{PUCCH(N_{PUCCH}-1)}^{(4)}/N_{SF,0}^{PUCCH} \rfloor$$

The wireless device 16 would only use up to $N_{PUCCH4}$ number of resources, although it is possible to configure the wireless device 16 with the maximum number of resources.

ii. Alternative 2: Use Modified PUCCH Format 3

In Some Embodiments, PUCCH Format 4 Uses a Modified PUCCH format 3 (e.g., PUCCH format 3 with TBCC) on multiple PRBs. In some embodiments, the number of PRBs needed for PUCCH format 4 is denoted as $N_{PUCCH4}$ and calculated by $$N_{PUCCH4} = \left\lceil \frac{O_{ACK} - 22}{q} \right\rceil + 1$$

where $O_{ACK}$ is the number of HARQ-ACK bits in total and q is the maximum number of HARQ-ACK bits that can be carried by one PRB using modified PUCCH format 3 (e.g., PUCCH format 3 with TBCC). In the formula above, 22 reflects the maximum number of HARQ-ACK bits already supported by legacy PUCCH format 3.

In some other embodiments, the number of PRBs needed for PUCCH format 4 is denoted as $N_{PUCCH4}$ and calculated by $$N_{PUCCH4} = \left\lceil \frac{O_{ACK} - q}{q} \right\rceil + 1$$

where $O_{ACK}$ is the number of HARQ-ACK bits in total and q is the maximum number of HARQ-ACK bits that can be carried by one PRB using modified PUCCH format 3 (e.g., PUCCH format 3 with TBCC).

In a manner similar to PUCCH format 3, the PUCCH resource for PUCCH format 4, which is denoted $n_{PUCCH}^{(4)}$, is determined according to higher layer configuration and a dynamic indication from the DL assignment. Based on the PUCCH format 4 resource $n_{PUCCH}^{(4)}$, the resource block numbers of the PUCCH format 4 resource m is determined by the following $$m = \lfloor n_{PUCCH}^{(4)}/N_{SF,0}^{PUCCH} \rfloor, \lfloor n_{PUCCH}^{(4)}/N_{SF,0}^{PUCCH} \rfloor + 1, \ldots, \lfloor n_{PUCCH}^{(4)}/N_{SF,0}^{PUCCH} \rfloor + N_{PUCCH4} - 1$$

The orthogonal sequence applied for the two slots is similar to the approach for PUCCH format 3. In one example, the same OCC applies for multiple PRBs. In another example, different OCCs apply for different PRBs following a predefined rule. A principle is that the OCC used for the resource block number with the lowest index should follow exactly the same approach for PUCCH format 3. This is to enable fallback operation.

B. Resource Allocation for PUCCH Format 4 Design Option 2

Design option 2 for PUCCH format 4 is to use legacy PUCCH format 3 or a modified PUCCH format 3 (e.g., PUCCH format 3 with TBCC) with multiple OCCs (on a single PRB) to carry more HARQ-ACK bits than is possible with the current, or legacy, PUCCH format 3 (i.e., to carry a number of HARQ-ACK bits that exceeds the capacity of legacy PUCCH format 3).

i. Alternative 1: Use Legacy PUCCH Format 3

In Some Embodiments, PUCCH Format 4 Uses the Legacy PUCCH format 3 with multiple OCCs. The number of OCCs needed for PUCCH format 4 is denoted as $C_{PUCCH4}$ and calculated by $$C_{PUCCH4} = \left\lceil \frac{O_{ACK}}{q} \right\rceil$$

where $O_{ACK}$ is the number of HARQ-ACK bits in total and q is the maximum number of HARQ-ACK bits that can be carried by one PRB and one OCC using PUCCH format 3, i.e., q is equal to 22. $C_{PUCCH4}$ is equal to or less than $N_{SF,1}^{PUCCH}$.

The orthogonal sequences applied for the two slots are defined, with respect to a predefined base sequence, by cyclic shifts $n_{oc,0}, n_{oc,0}+1, \ldots, n_{oc,0}+C_{PUCCH4}-1$ and $n_{oc,1}, n_{oc,1}+1, \ldots, n_{oc10}+C_{PUCCH4}-1$ derived by the following $$n_{oc,0} = n_{PUCCH}^{(4)} \bmod N_{SF,1}^{PUCCH}$$

$$n_{oc,1} = \begin{cases} (3n_{oc,0}) \bmod N_{SF,1}^{PUCCH} & \text{if } N_{SF,1}^{PUCCH} = 5 \\ n_{oc,0} \bmod N_{SF,1}^{PUCCH} & \text{otherwise} \end{cases}$$

where $N_{SF,0}^{PUCCH}$ is the length of the orthogonal sequence for slot 0 and $N_{SF,1}^{PUCCH}$ is the length of the orthogonal sequence for slot 1, where $N_{SF,0}^{PUCCH}=N_{SF,1}^{PUCCH}=5$ holds for both slots in a subframe using normal PUCCH format 4 while $N_{SF,0}^{PUCCH}=N_{SF,1}^{PUCCH}=4$ holds for the first slot and the second slot in a subframe using shortened PUCCH format 4.

In a manner similar to PUCCH format 3, the PUCCH resource for PUCCH format 4, which is denoted as $n_{PUCCH}^{(4)}$, is determined according to higher layer configuration and a dynamic indication from the DL assignment. Based on the PUCCH format 4 resource as $n_{PUCCH}^{(4)}$, the resource block number of the PUCCH format 4 resource m is determined by the following $$m = \lfloor n_{PUCCH}^{(4)}/N_{SF,0}^{PUCCH} \rfloor$$

ii. Alternative 2: Use Modified PUCCH Format 3

In some embodiments, PUCCH format 4 uses a modified PUCCH format 3 (e.g., PUCCH format 3 with TBCC) with multiple OCCs. In some embodiments, the number of OCCs needed for PUCCH format 4 is denoted as $C_{PUCCH4}$ and calculated by $$C_{PUCCH4} = \left\lceil \frac{O_{ACK} - 22}{q} \right\rceil + 1$$

where $O_{ACK}$ is the number of HARQ-ACK bits in total and q is the maximum number of HARQ-ACK bits that can be carried by one PRB with one OCC using modified PUCCH format 3 (e.g., PUCCH format 3 with TBCC). $C_{PUCCH4}$ is equal to or less than $N_{SF,1}^{PUCCH}$.

In some other embodiments, the number of PRBs needed for PUCCH format 4 is denoted as $C_{PUCCH4}$ and calculated by $$C_{PUCCH4} = \left\lceil \frac{O_{ACK} - q}{q} \right\rceil + 1$$

where $O_{ACK}$ is the number of HARQ-ACK bits in total and q is the maximum number of HARQ-ACK bits that can be carried by one PRB with one OCC using modified PUCCH format 3 (e.g., PUCCH format 3 with TBCC). $C_{PUCCH4}$ is equal to or less than $N_{SF,1}^{PUCCH}$.

The orthogonal sequences applied for the two slots are defined, with respect to a predefined base sequence, by cyclic shifts $n_{oc,0}, n_{oc,0}+1, \ldots, n_{oc,0}+C_{PUCCH4}-1$ and $n_{oc,1}, n_{oc,1}+1, \ldots, n_{oc10}+C_{PUCCH4}-1$ derived by the following $$n_{oc,0} = n_{PUCCH}^{(4)} \bmod N_{SF,1}^{PUCCH}$$

$$n_{oc,1} = \begin{cases} (3n_{oc,0}) \bmod N_{SF,1}^{PUCCH} & \text{if } N_{SF,1}^{PUCCH} = 5 \\ n_{oc,0} \bmod N_{SF,1}^{PUCCH} & \text{otherwise} \end{cases}$$

where $N_{SF,0}^{PUCCH}$ is the length of the orthogonal sequence for slot 0 and $N_{SF,1}^{PUCCH}$ is the length of the orthogonal sequence for slot 1, where $N_{SF,0}^{PUCCH}=N_{SF,1}^{PUCCH}=5$ holds for both slots in a subframe using normal PUCCH format 4 while $N_{SF,0}^{PUCCH}=N_{SF,1}^{PUCCH}=4$ holds for the first slot and the second slot in a subframe using shortened PUCCH format 4.

In a manner similar to PUCCH format 3, the PUCCH resource for PUCCH format 4, which is denoted as $n_{PUCCH}^{(4)}$, is determined according to higher layer configuration and a dynamic indication from the DL assignment. Based on the PUCCH format 4 resource $n_{PUCCH}^{(4)}$, the resource block number of the PUCCH format 4 resource m is determined by the following $$m=\lfloor n_{PUCCH}^{(4)}/N_{SF,0}^{PUCCH}\rfloor$$

C. Resource Allocation for PUCCH Format 4 Design Option 3

Design option 3 for PUCCH format 4 is to use legacy PUCCH format 3 or a modified PUCCH format 3 (e.g., PUCCH format 3 with TBCC) on multiple PRBs with multiple OCCs to carry more HARQ-ACK bits than is possible with the current, or legacy, PUCCH format 3 (i.e., to carry a number of HARQ-ACK bits that exceeds the capacity of legacy PUCCH format 3).

The total number of OCCs for PUCCH format 4 is denoted as $C_{PUCCH4}$ and calculated by $$C_{PUCCH4}=\left\lceil\frac{O_{ACK}}{q}\right\rceil$$

where $O_{ACK}$ is the number of HARQ-ACK bits in total and q is the maximum number of HARQ-ACK bits that can be carried by one PRB and one OCC using PUCCH format 3, i.e., q is equal to 22. $C_{PUCCH4}$ is larger than $N_{SF,1}^{PUCCH}$ in this case.

The number of PRBs for PUCCH format 4 is denoted as $N_{PUCCH4}$ and calculated by $$N_{PUCCH4}=\left\lceil\frac{C_{PUCCH4}}{N_{SF,1}^{PUCCH}}\right\rceil$$

D. Resource Allocation for PUCCH Format 4 Design Option 4

Design option 4 for PUCCH format 4 is to use a PUSCH structure for PUCCH format 4, i.e., one Demodulation Reference Signal (DMRS) per slot and remaining Resource Elements (REs) are used for transmitting the UCI information. The coding of UCI information bits could be Turbo code or convolutional code. The resource allocation for this option could be a high layer signaling or added in the DCI message for the DL assignment.

III. PUCCH Transmission

Figure 3:
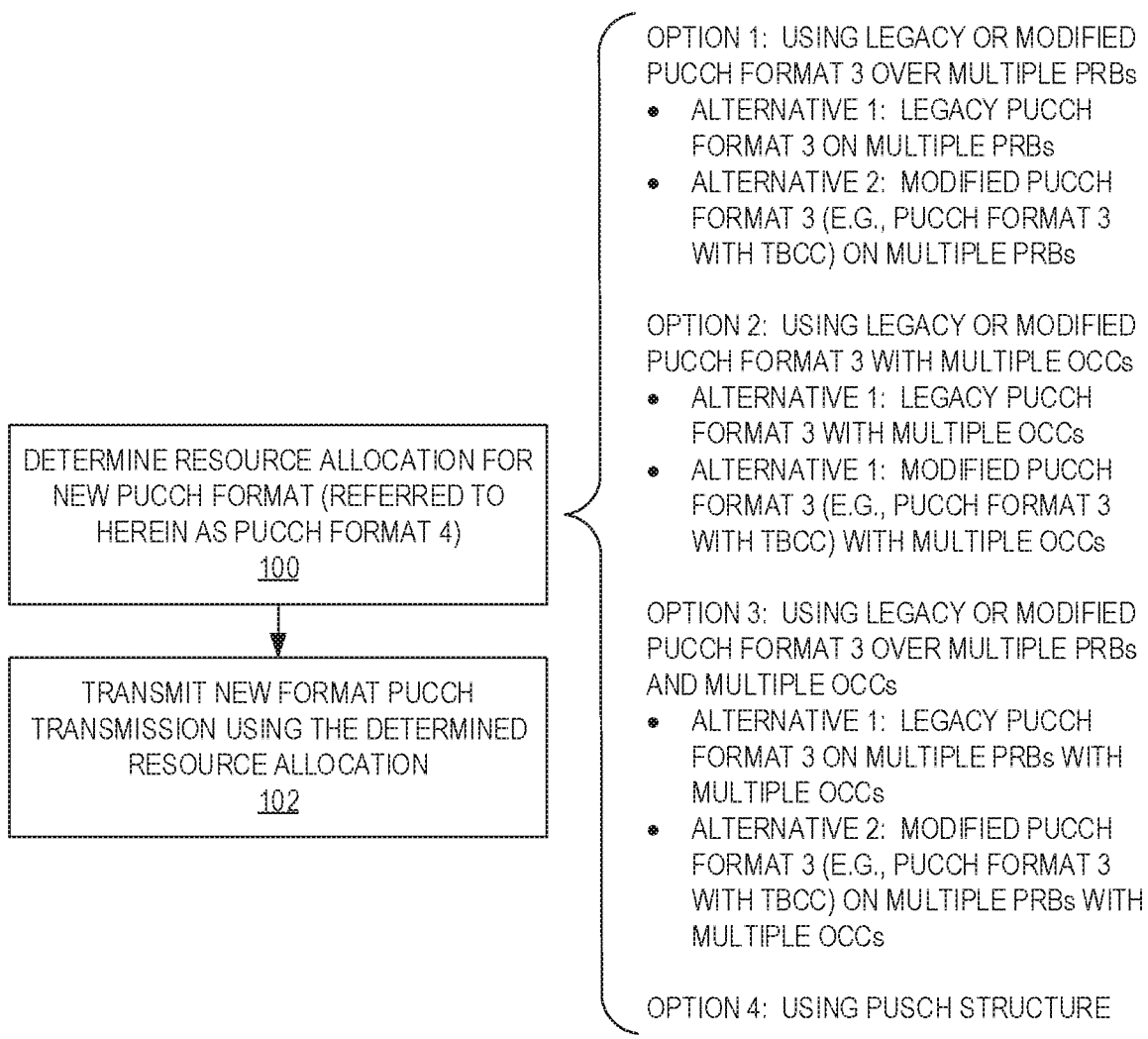
FIG. 3 is a flow chart that illustrates the operation of the wireless device to transmit PUCCH using the new PUCCH format according to some embodiments of the present disclosure.

FIG. 3 is a flow chart that illustrates the operation of the wireless device 16 to transmit PUCCH using PUCCH format 4 according to some embodiments of the present disclosure. As illustrated, the wireless device 16 determines a resource allocation for a PUCCH format 4 transmission, as described above (step 100). As discussed above, PUCCH format 4 may use the legacy or modified PUCCH format 3 over multiple PRBs, with multiple OCCs (over a single PRB), or with both multiple PRBs and multiple OCCs. In each of these options, the manner in which the resource allocation is determined is described above. The wireless device 16 transmits a PUCCH format 4 transmission using the determined resource allocation (step 102).

IV. Fallback Operation for PUCCH Format 4

Figure 4:
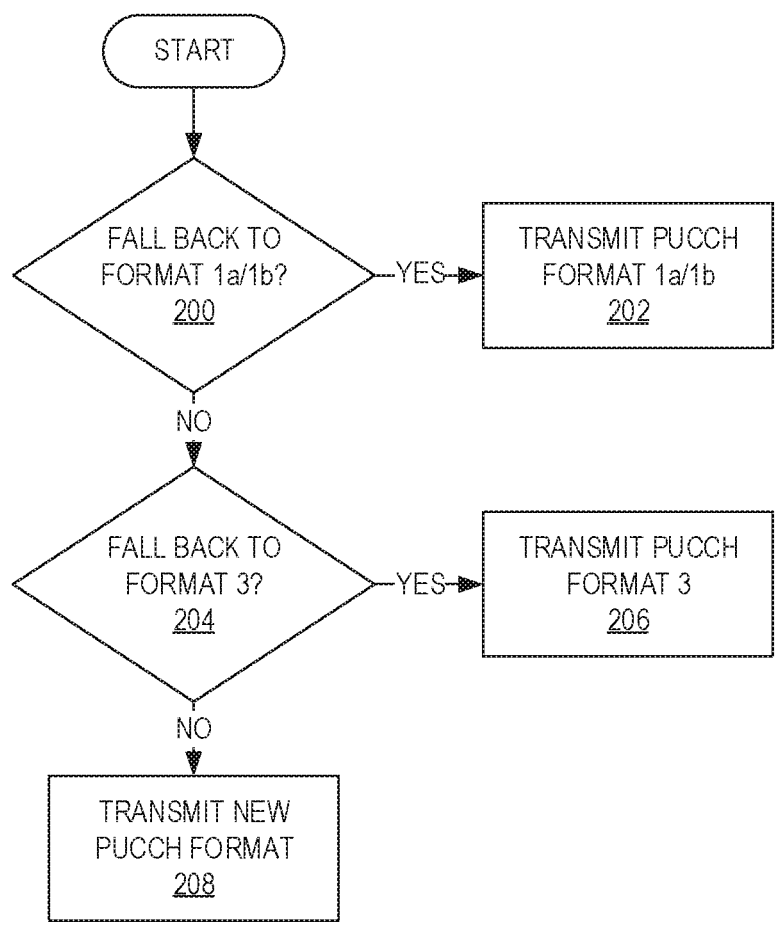
FIG. 4 is a flow chart that illustrates a fallback procedure for the new PUCCH format according to some embodiments of the present disclosure.

The following discussion provides embodiments of fallback operation for PUCCH format 4 design options. A flow chart that illustrates a fallback procedure is illustrated in FIG. 4. As illustrated, the wireless device 16 determines whether to fall back to PUCCH format 1a/1b (step 200). If so, rather than transmitting using PUCCH format 4, the wireless device 16 transmits a PUCCH transmission in PUCCH format 1a/1b (step 202). If the wireless device 16 determines that fallback to PUCCH format 1a/1b is not appropriate, the wireless device 16 determines whether to fall back to PUCCH format 3 (step 204). If so, the wireless device 16 transmits a PUCCH transmission in PUCCH format 3 (step 206). Otherwise, if fallback to PUCCH format 3 is also not appropriate, the wireless device 16 transmits a PUCCH transmission in the new PUCCH format (again referred to herein as PUCCH format 4) (step 208).

Figure 5:
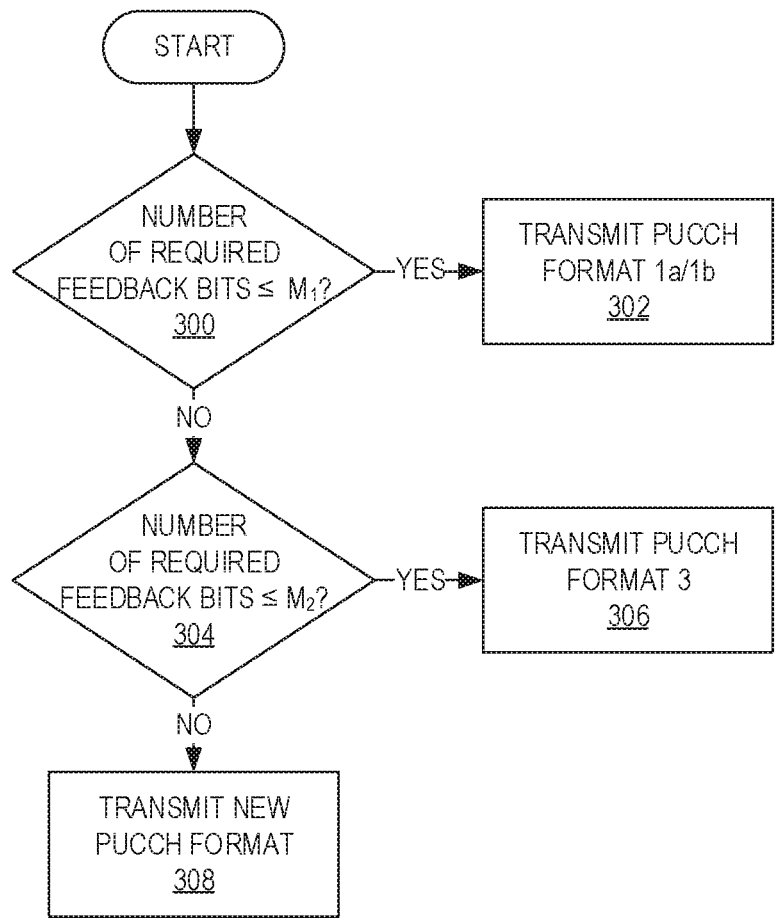
FIG. 5 is a flow chart that illustrates a fallback procedure for the new PUCCH format according to some embodiments of the present disclosure.

FIG. 5 is a flow chart that illustrates a fallback procedure in accordance with some embodiments of the present disclosure. In general, fallback decisions are made based on the number of feedback bits that are required in a subframe to provide the desired feedback. As illustrated, the wireless device 16 determines whether the number of required feedback bits for the subframe is less than or equal to a first threshold, $M_1$ (step 300). In some particular embodiments, the first threshold, $M_1$, is 2. If the number of required feedback bits for the subframe is less than or equal to the first threshold, $M_1$, then the wireless device 16 decides to fall back to PUCCH format 1a/1b and, as such, transmits a PUCCH transmission for the subframe in PUCCH format 1a/1b (step 302). If the required number of feedback bits for the subframe is greater than the first threshold, $M_1$, but less than or equal to a second threshold, $M_2$ (step 304; YES), the wireless device 16 decides to fall back to PUCCH format 3 and, as such, transmits a PUCCH transmission for the subframe in PUCCH format 3 (step 306). In some particular embodiments, the second threshold, $M_2$, is 22. If the required number of feedback bits for the subframe is greater than the second threshold, $M_2$ (step 304; NO), the wireless device 16 decides that there should be no fallback and, as such, transmits a PUCCH transmission for the subframe in PUCCH format 4 (step 308).

Notably, while FIG. 5 focuses on the condition of the number of feedback bits being less than the first threshold, $M_1$, for fallback to PUCCH format 1a/1b, as discussed below, one or more additional conditions may also be required before fallback to PUCCH format 1a/1b. For example, as discussed below, if PUCCH is provided on the PCell, the additional condition(s) may include, e.g.:

For a Frequency Division Duplex (FDD) PCell, a condition that no (Enhanced) Physical DL Control Channel ((E)PDCCH) corresponding to Physical DL Shared Channel (PDSCH) on SCells is received and a condition that PDSCH is received on the PCell; and For a Time Division Duplex (TDD) PCell, a condition that no (E)PDCCH corresponding to PDSCH on SCells is received and a condition that PDSCH is received on the PCell in only one DL subframe where the Downlink Assignment Indicator (DAI) value is set to '1.'

Other example conditions that may also be considered in addition to the number of required feedback bits for fallback to PUCCH format 1a/1b are described below. In a similar manner, one or more additional conditions for fallback to PUCCH format 3 may also be considered.

In other words, the process of FIG. 5 can be described as follows. If the required feedback bits in a subframe are included in a predefined segmentation with length $M_1$ bits, referred to herein as a first predefined segmentation, format 1a/1b is used. For example, in Release 10 (Rel-10), the predefined segmentation corresponds to the first 2 bits. As an example, $M_1=2$. Otherwise, if the required feedback bits in a subframe are included in a predefined segmentation with length $M_2$ bits, referred to herein as a second predefined segmentation, format 3 is used. As one example, the second predefined segmentation corresponds to the first $M_2=22$ bits. Otherwise, a new format such as format 4 is used.

Figure 6:
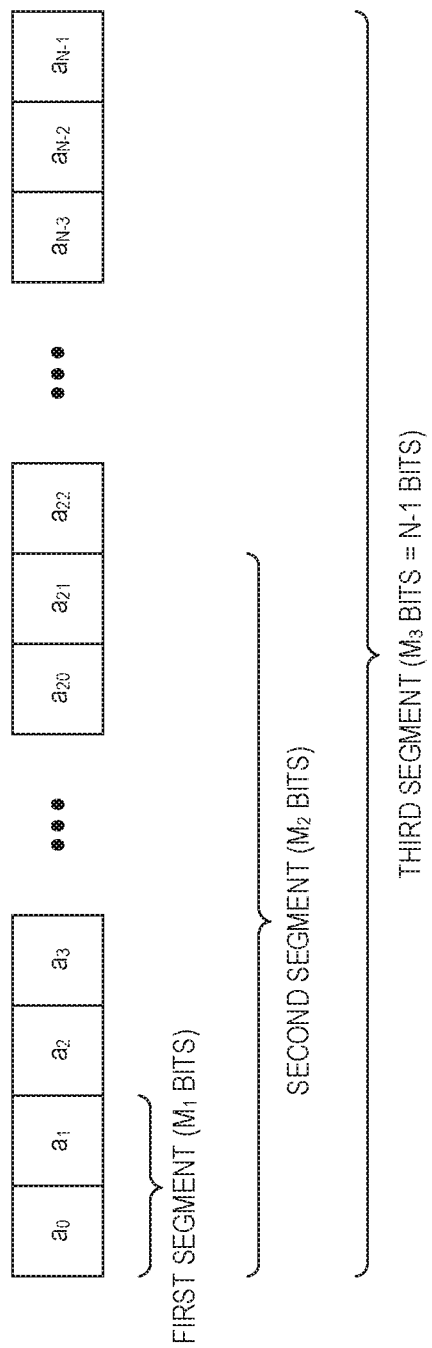
FIG. 6 illustrates one example segmentation of feedback bits for the new PUCCH format.

One example is shown in FIG. 6. Assuming the feedback bits (i.e., the total number N of feedback bits to accommodate feedback for up to 32 cells) are $a_n$ (n=0, . . . , N−1), the first segmentation includes feedback bits $a_0$, $a_1$, and the second segment includes feedback bits $a_0$, $a_1$, . . . , $a_{20}$, $a_{21}$. In case only $a_0$, $a_1$, or both $a_0$ and $a_1$ are required for feedback, format 1a/1b is used. In case some (or all) of bits $a_0$, . . . , $a_{21}$ are required for feedback in addition to $a_0$, or $a_1$ or $a_0,a_1$, and no other feedback is required, format 3 is used. Otherwise, a new format such as format 4 is used.

In the following section, detailed conditions on the fallback operation for various embodiments of the present disclosure are provided. In general, these various conditions are indicative of whether the feedback bits are required only for the PCell or the PUCCH SCell in a cell group, and/or whether the number of required feedback bits is less than or equal to $M_1$, greater than $M_1$ but less than or equal to $M_2$, or greater than $M_2$ and, as such, are indicative of whether fallback operation should be used and, if so, which PUCCH format to use for the fallback operation.

A. PUCCH on PCell i. Fall Back to PUCCH Format 1a/1b

In some embodiments, the fallback of PUCCH format 4 is PUCCH format 1a/1b for some specific conditions listed below:
- For a Frequency Division Duplex (FDD) PCell, if no (Enhanced) Physical DL Control Channel ((E)PDCCH) corresponding to Physical DL Shared Channel (PDSCH) on SCells is received and PDSCH is received on the PCell, fall back to PUCCH format 1a/1b.
  In this case, only $a_0$ or $a_0$, $a_1$ is required.
- For a Time Division Duplex (TDD) PCell, if no (E)PDCCH corresponding to PDSCH on SCells is received and PDSCH is received on the PCell in only one DL subframe where the Downlink Assignment Indicator (DAI) value is set to '1,' fall back to PUCCH format 1a/1b.

Otherwise, PUCCH format 4 will fall back to format 3 when some other specific conditions are satisfied, which are described in the "Fall back to PUCCH format 3" section.

Figure 7A:
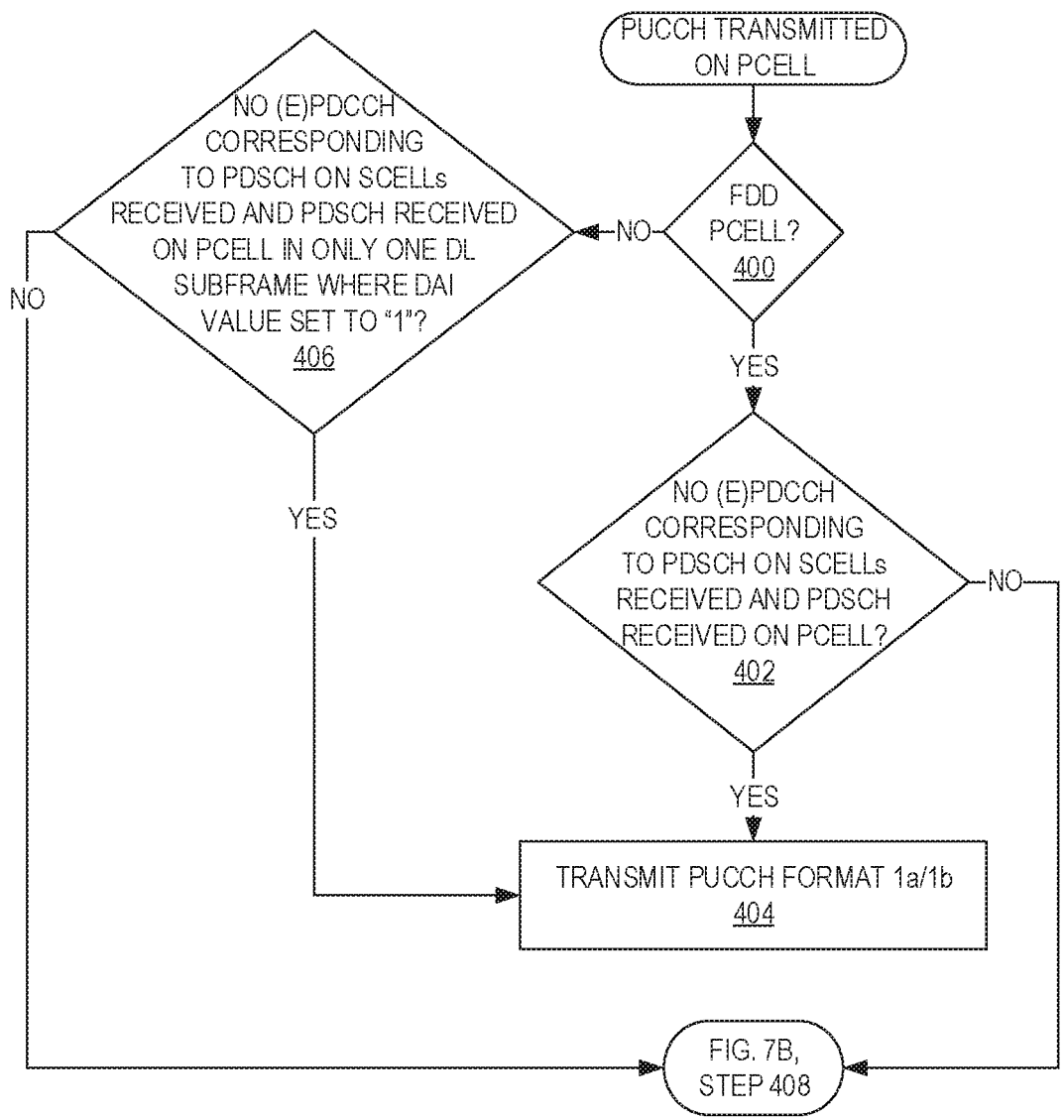
FIGS. 7A and 7B illustrate a fallback procedure performed by the wireless device for the new PUCCH format according to some embodiments of the present disclosure.
Figure 7B:
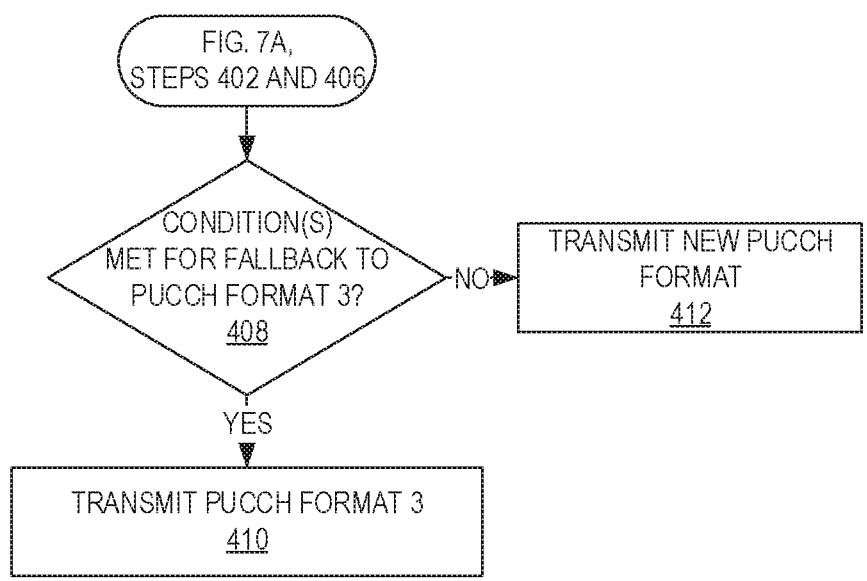

In this regard, FIGS. 7A and 7B illustrate a fallback procedure performed by the wireless device 16 according to some embodiments of the present disclosure. As illustrated, PUCCH is transmitted on the PCell 14-1 of the wireless device 16. In order to determine whether PUCCH format 4 should fall back to some other PUCCH format, the wireless device 16 determines whether the PCell 14-1 is on an FDD carrier or a TDD carrier (step 400). If the PCell 14-1 of the wireless device 16 is on an FDD carrier, the wireless device 16 determines whether: (a) the wireless device 16 has received no (E)PDCCH corresponding to PDSCH on any SCells 14 of the wireless device 16 and (b) the wireless device 16 has received a PDSCH on the PCell 14-1 (step 402). If the conditions in step 402 are true, then the wireless device 16 decides that fallback to PUCCH format 1a/1b is appropriate and, as such, transmits PUCCH according to format 1a/1b (step 404).

Returning to step 400, if the PCell 14-1 of the wireless device 16 is not an FDD cell (i.e., if the PCell 14-1 of the wireless device 16 is a TDD cell), the wireless device 16 determines whether: (a) the wireless device 16 has received no (E)PDCCH corresponding to PDSCH on any SCells 14 of the wireless device 16 and (b) the wireless device 16 has received a PDSCH on the PCell 14-1 in only one DL subframe where the DAI value is set to "1" (step 406). If the conditions in step 406 are true, then the wireless device 16 decides that fallback to PUCCH format 1a/1b is appropriate and, as such, transmits PUCCH according to format 1a/1b (step 404).

If the conditions in step 402 are false for a FDD PCell or if the conditions in step 406 are false for a TDD PCell, the wireless device 16 determines whether one or more conditions for fallback to PUCCH format 3 are satisfied (step 408). While any suitable conditions may be used, some example conditions for fallback to PUCCH format 3 for the case where PUCCH is transmitted on the PCell 14-1 are described in the following section. If the condition(s) for fallback to PUCCH format 3 is satisfied, the wireless device 16 decides that fallback to PUCCH format 3 is appropriate and, as such, transmits PUCCH according to format 3 (step 410). However, if the condition(s) for fallback to PUCCH format 3 is not satisfied, the wireless device 16 decides that fallback to PUCCH format 3 is not appropriate and, as such, transmits PUCCH according to the new format, which again is referred to herein as format 4 (step 412).

ii. Fallback to PUCCH Format 3

If the condition of falling back to PUCCH format 1a/1b is not satisfied, PUCCH format 4 may fall back to format 3. The conditions to fall back to format 3 are included in the following embodiments.

Figure 8:
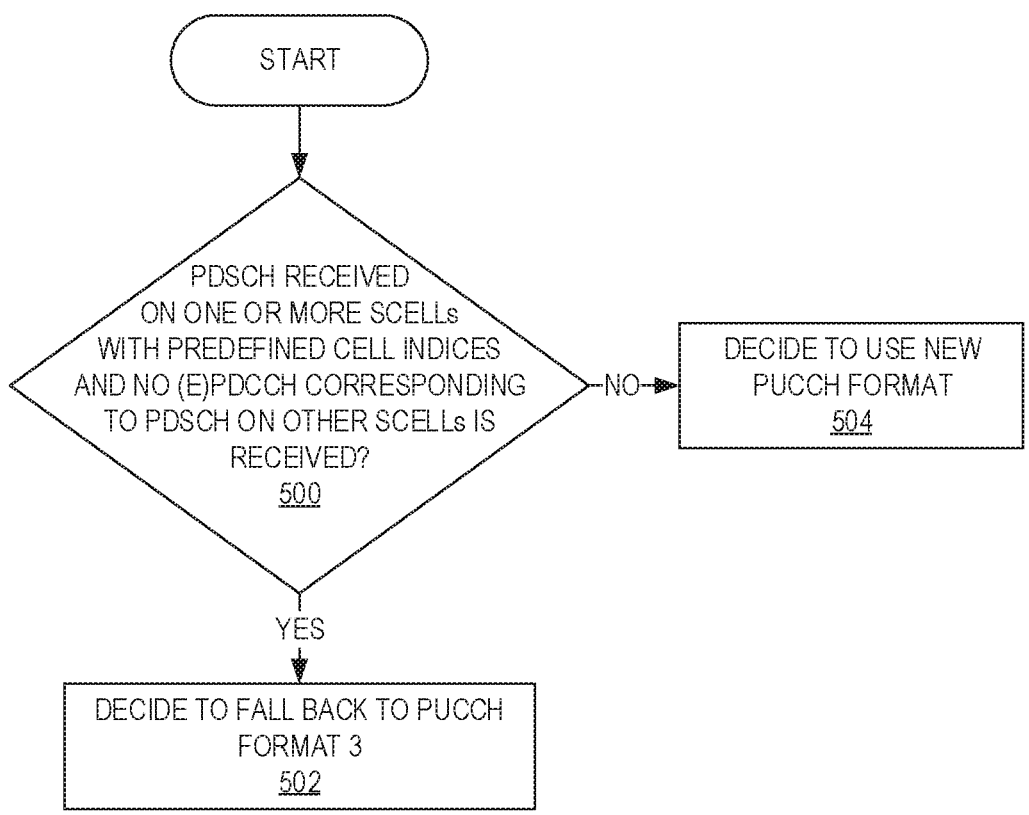
FIG. 8 is a flow chart that illustrates a decision process for deciding whether to fall back from the new PUCCH format to PUCCH format 3 according to some embodiments of the present disclosure.

In some embodiments, if PDSCH is received on one or more SCells with predefined cell indices and no (E)PDCCH corresponding to PDSCH on other SCells is received, PUCCH format 4 falls back to PUCCH format 3. This decision process, which may be viewed as one example embodiment of step 408 of FIG. 7B, is illustrated in FIG. 8. As illustrated, the wireless device 16 determines whether: (a) the wireless device 16 received PDSCH on one or more SCells 14 with predefined indices and (b) the wireless device 16 received no (E)PDCCH corresponding to PDSCH on any other SCells 14 (step 500). If these conditions are satisfied, the wireless device 16 decides to fall back to PUCCH format 3 (step 502). Otherwise, the wireless device 16 decides to use the new PUCCH format (format 4) (step 504).

As one example of the predefined cell indices, the cell indices 1-4 may be set as the predefined cell indices. Given this condition, if all the CCs are FDD carriers, the second segmentation includes HARQ-ACK feedback bits $a_0$, $a_1$, . . . , $a_9$ without appending of a SR. If all the CCs are TDD carriers, the second segmentation includes HARQ-ACK feedback bits $a_0$, $a_1$, . . . , $a_{19}$ without appending of a SR. If the CCs are a mixture of FDD and TDD carriers, the second segmentation includes HARQ-ACK feedback bits $a_0$, $a_1, \ldots, a_{M-1}$, where M is determined by the carrier configuration of cell indices 1-4. Note that 1 bit SR can be appended on HARQ-ACK feedback and sent on the same PUCCH format.

Figure 9:
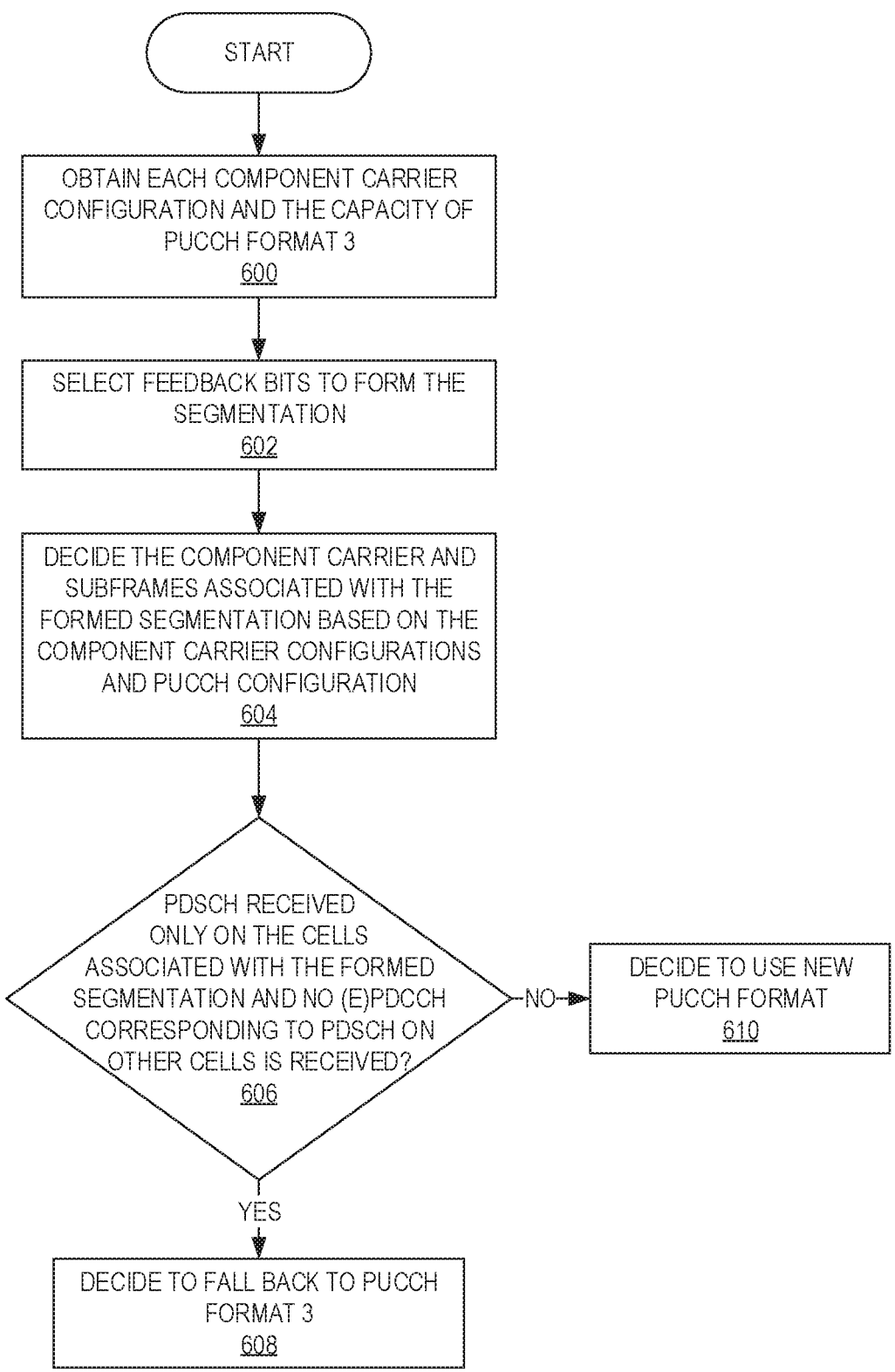
FIG. 9 is a flow chart that illustrates process for deciding whether to fall back from the new PUCCH format to PUCCH format 3 according to some embodiments of the present disclosure.

In some embodiments, the following steps could be used to determine the condition for the format 3 fallback. These steps are illustrated in the flow chart of FIG. 9.

- Obtaining each CC configuration and the capacity of PUCCH format 3 which can be used for the HARQ-ACK feedback (step 600).
- Selecting the feedback bits to form the segmentation, the size of the segmentation is based on the obtained capacity (step 602).
- Deciding the CC and subframes associated with the formed segmentation based on the information of the CC configurations and PUCCH configuration (step 604).

If PDSCH is received only on the cells associated with the formed segmentation and no (E)PDCCH corresponding to PDSCH on other cells is received (step 606; YES), the wireless device 16 decides to fall back to PUCCH format 3 (step 608). Otherwise (step 606; NO), the wireless device 16 decides to use the new PUCCH format (i.e., format 4) (step 610). The process of FIG. 9 can be viewed as one embodiment of step 408 of FIG. 7B.

In this embodiment, the associated cell indices may be different on different Uplink (UL) subframes to determine the fallback to PUCCH format 3. As one example, in case of TDD CA, assuming there are 6 CCs and the TDD configuration for the 6 CCs are:

- CC0: UL-DL configuration 1 (primary carrier)
- CC1: UL-DL configuration 0
- CC2: UL-DL configuration 1
- CC3: UL-DL configuration 1
- CC4: UL-DL configuration 1
- CC5: UL-DL configuration 1

The UL-DL configuration is defined in 3GPP TS 36.211 V13.0.0. In this case, the cell indices associated with the formed segmentation for different subframes are:

- In case the PUCCH is transmitted on subframe 7 or subframe 2, the cell indices associated with the PUCCH on these subframes are 0, 1, 2, 3, 4, 5
- In case the PUCCH is transmitted on subframe 8 or subframe 3, the cell indices associated with the PUCCH on these subframes are 0,2,3,4,5,6

Figure 10:
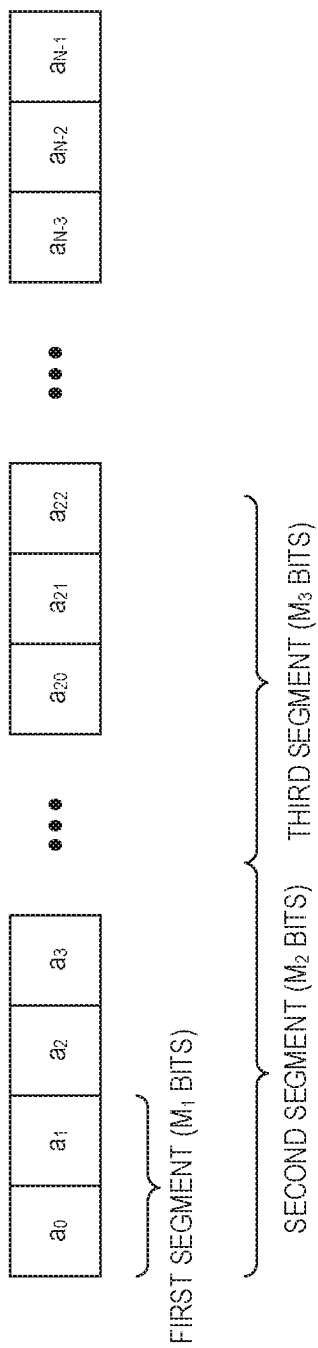
FIG. 10 illustrates another example segmentation of feedback bits for the new PUCCH format.

In some embodiments, a plurality of segmentations may be formed. Each segmentation is allocated on one PUCCH format 3 resource. The PUCCH format 3 resource may be overlapped with the PUCCH format 4 resource. Further, the PUCCH format 3 resource may be derived from the resource allocation for PUCCH format 4. If all the PDSCHs are received only on the cells corresponding to one segmentation, the PUCCH format will fall back to format 3, and the resource for the fallback is given by the allocated PUCCH format 3 resource associated with the segmentation. As one example shown in FIG. 10, assuming that there are 20 FDD carriers, the second segment including the feedback bits corresponding to CC 0~9, and the third segment including the feedback bits corresponding to CC 10~19, assume the PUCCH resource $m = \lfloor n_{PUCCH(0)}^{(4)}/N_{SF,0}^{PUCCH} \rfloor$, $\lfloor n_{PUCCH(1)}^{(4)}/N_{SF,0}^{PUCCH} \rfloor$ is allocated for PUCCH format 4. In this case:

- If PDSCH is received only on the cells with cell indices 0~9 and no (E)PDCCH corresponding to PDSCH on other cells is received, format 4 will fall back to PUCCH format 3 and the resource $n_{PUCCH(0)}^{(4)}/N_{SF,0}^{PUCCH}$ will be used for the PUCCH format 3.
- If PDSCH is received only on the cells with cell indices 10~19 and no (E)PDCCH corresponding to PDSCH on other cells is received, format 4 will fall back to PUCCH format 3 and the resource $n_{PUCCH(1)}^{(4)}/N_{SF,0}^{PUCCH}$ will be used for the PUCCH format 3.
- Otherwise, PUCCH format 4 will be used.

Figure 11:
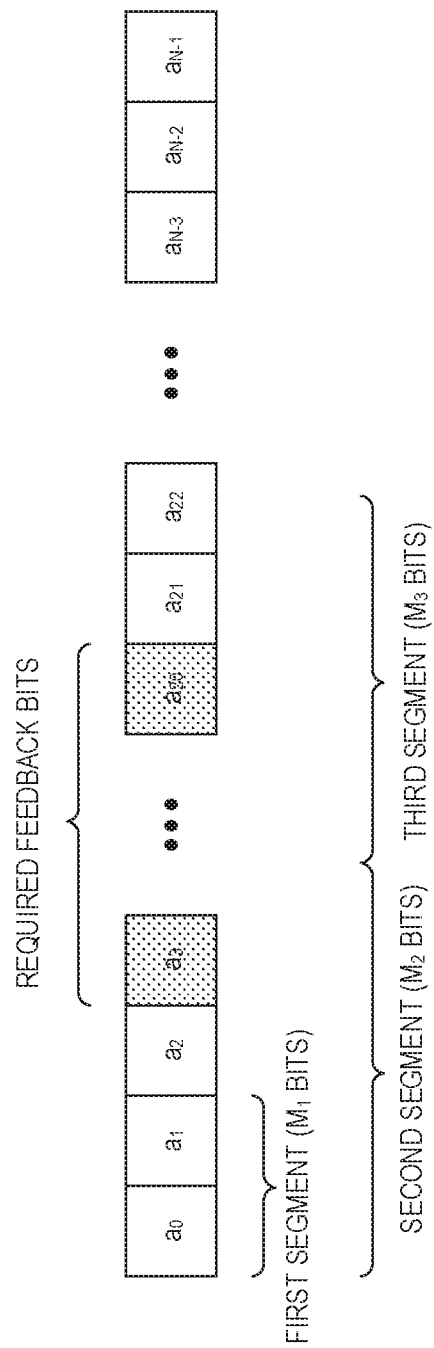
FIG. 11 illustrates another example segmentation of feedback bits for the new PUCCH format.

In some embodiments, a plurality of segmentations may be formed. Each segmentation is allocated one PUCCH format 3 resource. If the PDSCHs are received on the cells associated with multiple segmentations, the PUCCH format may fall back to multiple PUCCH format 3 transmissions and the resources for the fallback are given by the allocated PUCCH format 3 resources associated with these segmentations. As one example shown in FIG. 11, assuming there are 20 FDD carriers, the second segment including the feedback bits corresponding to CC 0~9, and the third segment including the feedback bits corresponding to CC 10~19, assume the PUCCH resource $m = \lfloor n_{PUCCH(0)}^{(4)}/N_{SF,0}^{PUCCH} \rfloor$, $\lfloor n_{PUCCH(1)}^{(4)}/N_{SF,0}^{PUCCH} \rfloor$ is allocated for PUCCH format 4. In this case:

- If PDSCH is received only on the cells with cell indices 0~9 and no (E)PDCCH corresponding to PDSCH on other cells is received, format 4 will fall back to PUCCH format 3 and the resource $n_{PUCCH(0)}^{(4)}/N_{SF,0}^{PUCCH}$ will be used for the PUCCH format 3.
- If PDSCH is received only on the cells with cell indices 10~19 and no (E)PDCCH corresponding to PDSCH on other cells is received, format 4 will fall back to PUCCH format 3 and the resource $n_{PUCCH(1)}^{(4)}/N_{SF,0}^{PUCCH}$ will be used for the PUCCH format 3.
- If PDSCH is received on some cells with cell indices 0~9 and some cells with cell indices 10~19, and no (E)PDCCH corresponding to PDSCH on other cells is received, format 4 will fall back to two PUCCH format 3 transmissions, where the resource $n_{PUCCH(0)}^{(4)}/N_{SF,0}^{PUCCH}$ and the resource $n_{PUCCH(1)}^{(4)}/N_{SF,0}^{PUCCH}$ will be used for respective PUCCH format 3 transmissions.
- Otherwise, PUCCH format 4 will be used.

B. PUCCH on SCell

In case there is PUCCH transmitted on SCells 14 of the wireless device 16, there may exist multiple PUCCH cell groups. In each PUCCH cell group, there may exist multiple DL carriers. For PUCCH on SCells 14, there are multiple realization methods for PUCCH transmission:

- PUCCH is transmitted on one SCell 14 configured by higher-layer signaling to carry PUCCH for SCells 14 in the PUCCH cell group.
- PUCCH is transmitted on the PCell 14-1 for SCells 14 in the PUCCH cell group.
- PUCCH is transmitted on SCell-only (i.e., no PUCCH on the PCell 14-1). Note that, based on current agreements, PUCCH on SCell-only (i.e., no PUCCH on the PCell 14-1) is not supported in Rel-13, but may be re-discussed in a future release.

For the first two realizations, PUCCH is transmitted on both the PCell 14-1 and an SCell 14. For the third realization, there is no PUCCH on the PCell 14-1. For the first two realizations, the fallback condition is similar. For the third realization, the fallback condition for format 1a/1b is slightly different. The following sections provide details on the fallback solution for the first two realizations and the third realization, respectively.

i. PUCCH is Transmitted on Both PCell and SCell

Here, Primary SCell (pSCell) is used to denote the cell which transmits PUCCH in the PUCCH cell group. If PUCCH is transmitted on the PCell for SCells in the PUCCH cell group, the pSCell is the PCell. Otherwise, pSCell is one of the SCells, and therefore can be also referred to as a PUCCH-SCell.

In some embodiments, all of the description above in the section "PUCCH on PCell" can be applied for each PUCCH cell group. The fallback operation may be independent between cell groups.

As one example, for PUCCH format 1a/1b fallback, the specific conditions are listed below:
- For FDD pSCell, if no (E)PDCCH corresponding to PDSCH on SCells in the PUCCH cell group is received and PDSCH is received on pSCell, fall back to PUCCH format 1a/1b.
- For TDD pSCell, if no (E)PDCCH corresponding to PDSCH on SCells in the PUCCH cell group is received and PDSCH is received on pSCell in only one DL subframe where the DAI value is set to '1,' fall back to PUCCH format 1a/1b.

Figure 12A:
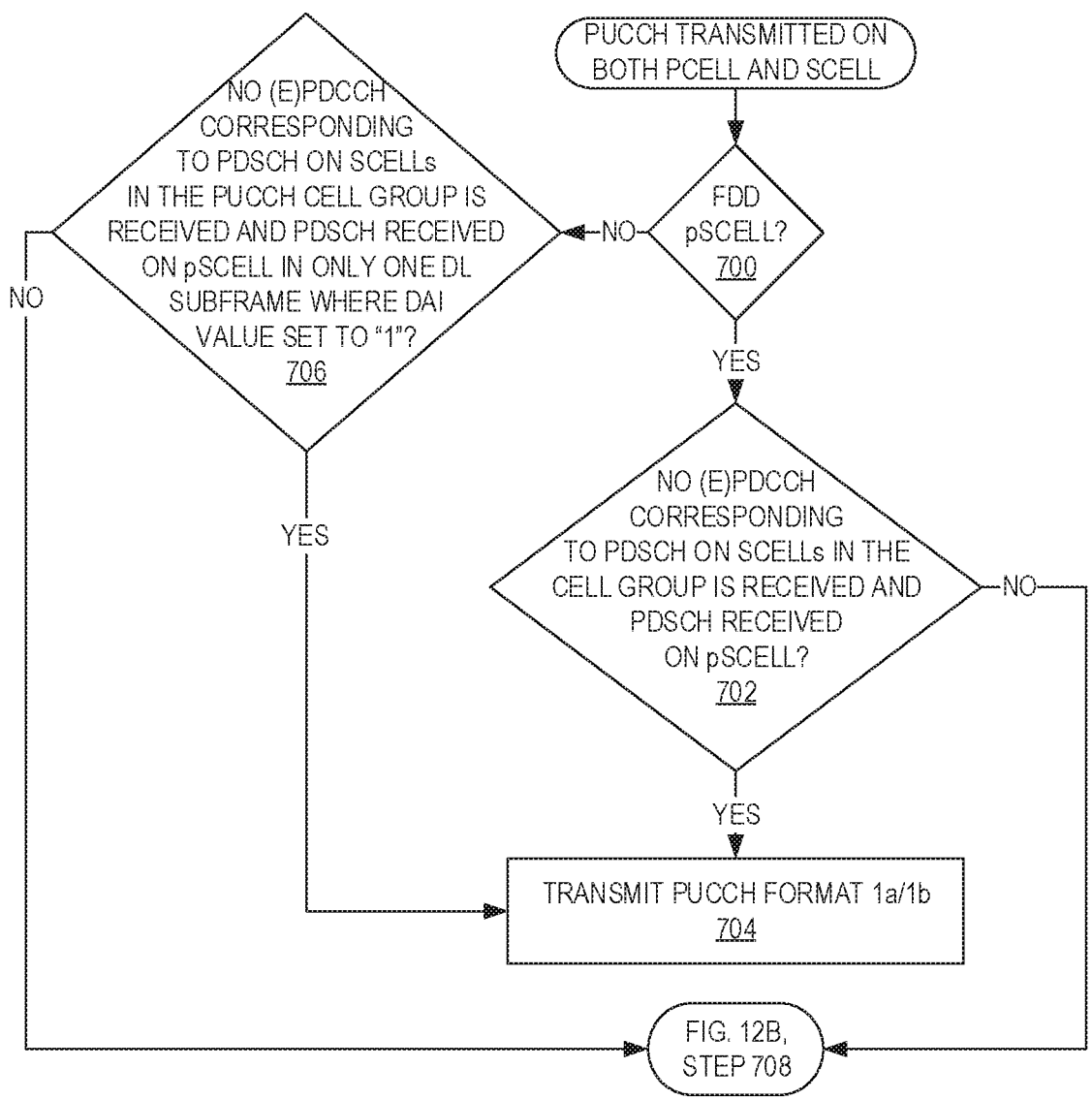
FIGS. 12A and 12B illustrate a fallback procedure performed by the wireless device for the new PUCCH format according to some embodiments of the present disclosure.
Figure 12B:
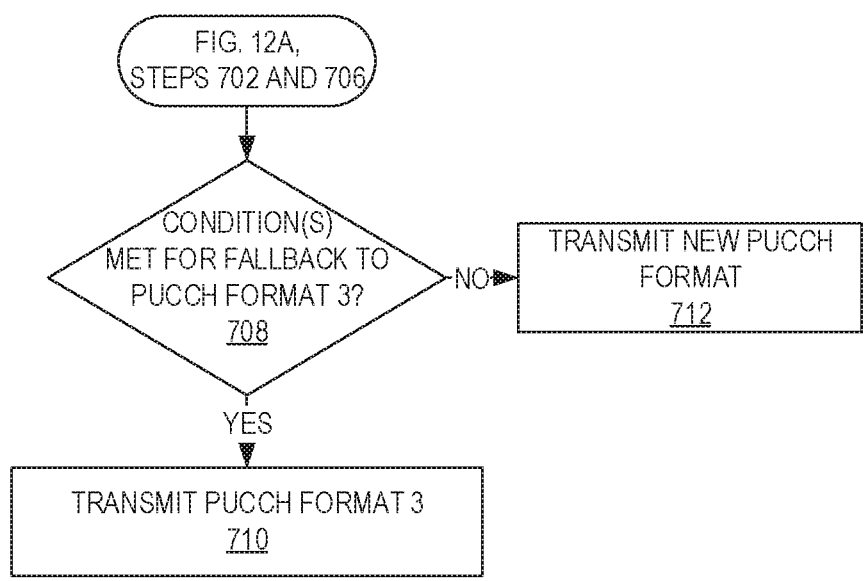

In this regard, FIGS. 12A and 12B illustrate a fallback procedure performed by the wireless device 16 according to some embodiments of the present disclosure. This fallback procedure implements the conditions for fallback to PUCCH format 1a/1b provided above. As illustrated, PUCCH is transmitted on both the PCell 14-1 and an SCell 14. In order to determine whether PUCCH format 4 should fall back to some other PUCCH format, the wireless device 16 determines whether the pSCell, which can be the PCell 14-1 or one of the SCells 14 of the wireless device 16, for a PUCCH cell group for such a PUCCH transmission is desired is on an FDD carrier or a TDD carrier (step 700). If the pSCell of the wireless device 16 is on an FDD carrier, the wireless device 16 determines whether: (a) the wireless device 16 has received no (E)PDCCH corresponding to PDSCH on any SCells 14 of the wireless device 16 in the PUCCH cell group and (b) the wireless device 16 has received a PDSCH on the pSCell of the PUCCH cell group (step 702). If the conditions in step 702 are true, then the wireless device 16 decides that fallback to PUCCH format 1a/1b is appropriate and, as such, transmits PUCCH according to format 1a/1b (step 704).

Returning to step 700, if the pSCell of the wireless device 16 for the PUCCH cell group is not an FDD cell (i.e., if the pSCell of the wireless device 16 is a TDD cell), the wireless device 16 determines whether: (a) the wireless device 16 has received no (E)PDCCH corresponding to PDSCH on any SCells of the wireless device 16 in the PUCCH cell group and (b) the wireless device 16 has received a PDSCH on the pSCell in only one DL subframe where the DAI value is set to "1" (step 706). If the conditions in step 706 are true, then the wireless device 16 decides that fallback to PUCCH format 1a/1b is appropriate and, as such, transmits PUCCH according to format 1a/1b (step 704).

If the conditions in step 702 are false for a FDD pSCell or if the conditions in step 706 are false for a TDD pSCell, the wireless device 16 determines whether one or more conditions for fallback to PUCCH format 3 are satisfied (step 708). While any suitable conditions may be used, some example conditions for fallback to PUCCH format 3 for the case where PUCCH is transmitted on the PCell 14-1 are described below. If the condition(s) for fallback to PUCCH format 3 is satisfied, the wireless device 16 decides that fallback to PUCCH format 3 is appropriate and, as such, transmits PUCCH according to format 3 (step 710). However, if the condition(s) for fallback to PUCCH format 3 is not satisfied, the wireless device 16 decides that fallback to PUCCH format 3 is not appropriate and, as such, transmits PUCCH according to the new format, which again is referred to herein as format 4 (step 712).

Figure 13:
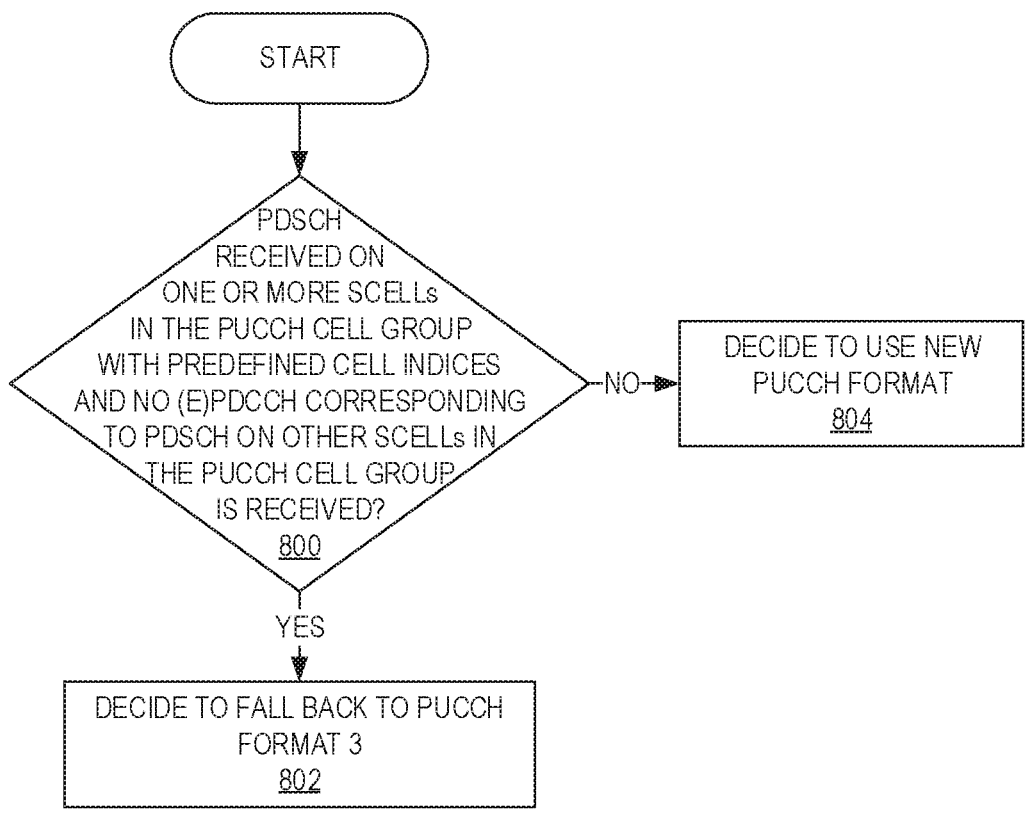
FIG. 13 is a flow chart that illustrates a decision process for deciding whether to fall back from the new PUCCH format to PUCCH format 3 according to some embodiments of the present disclosure.
Figure 14:
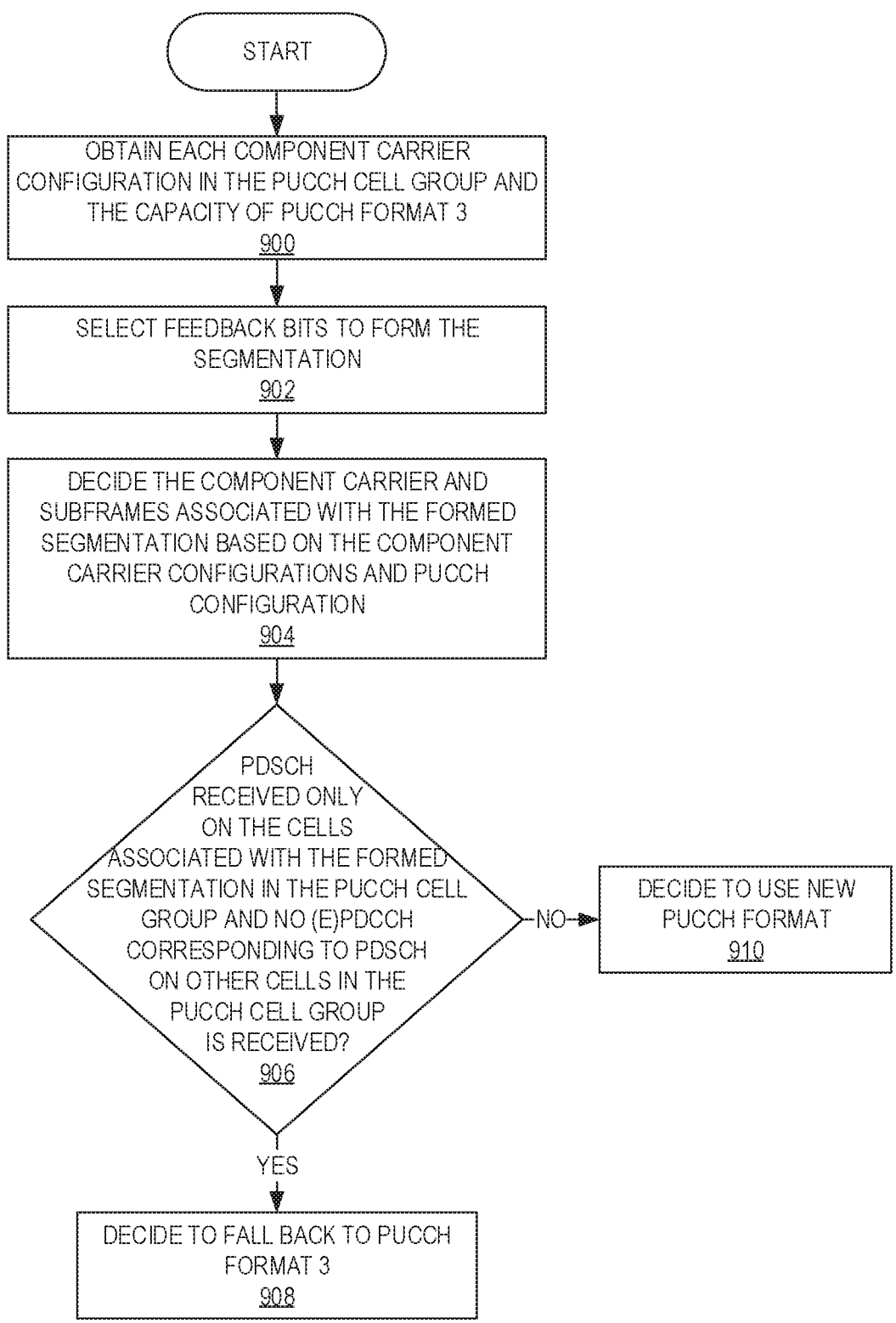
FIG. 14 is a flow chart that illustrates a decision process for deciding whether to fall back from the new PUCCH format to PUCCH format 3 according to some other embodiments of the present disclosure.

For fallback to PUCCH format 3, the embodiments described above in the section "PUCCH on PCell" may be updated into:
- Embodiment #1: If PDSCH is received on one or more SCells in the PUCCH cell group with predefined cell indices and no (E)PDCCH corresponding to PDSCH on other SCells in the PUCCH cell group is received, fall back to PUCCH format 3. This is illustrated in FIG. 13. This process may be viewed as one example embodiment of step 708 of FIG. 12B. As illustrated, the wireless device 16 determines whether: (a) the wireless device 16 received PDSCH on one or more SCells in the PUCCH cell group with predefined indices and (b) the wireless device 16 received no (E)PDCCH corresponding to PDSCH on any other SCells in the PUCCH cell group (step 800). If these conditions are satisfied, the wireless device 16 decides to fall back to PUCCH format 3 (step 802). Otherwise, the wireless device 16 decides to use the new PUCCH format (format 4) (step 804).
- Embodiment #2: In some embodiments, the following steps could be used to determine the condition for the format 3 fallback. These steps are illustrated in the flow chart of FIG. 14.
  - Obtain each CC configuration in the PUCCH cell group and the capacity of PUCCH format 3 which can be used for the HARQ-ACK feedbacks (step 900).
  - Select the HARQ-ACK feedback bits to form the segmentation, the size of the segmentation is based on the obtained capacity (step 902).
  - Decide the CC and subframes associated with the formed segmentation based on the information for the CC configurations and PUCCH configuration (step 904).
  - If PDSCH is received only on the cells associated with the formed segmentation in the PUCCH cell group and no (E)PDCCH corresponding to PDSCH on other cells in the PUCCH cell group is received (step 906; YES), fall back to PUCCH format 3 (step 908). Otherwise (step 906; NO), decide to use the new PUCCH format (i.e., PUCCH format 4) (step 910).
- Embodiment #3: In some embodiments, a plurality of segmentations may be formed in each PUCCH cell group.

Not all the embodiments in the section "PUCCH on PCell" are elaborated in this section. Similar principles can be applied to the embodiments which are not repeated here.

ii. PUCCH is Transmitted on SCell Only (i.e., No PUCCH on PCell)

For this case, the fallback to format 1a/1b described above for the PUCCH on PCell and PUCCH on PCell and SCell is modified into:
- For an FDD PCell, if no (E)PDCCH corresponding to PDSCH on SCells is received and PDSCH is received on the PCell, fall back to PUCCH format 1a/1b. The PUCCH format 1a/1b is transmitted on the SCell UL carrier.

For a TDD PCell, if no (E)PDCCH corresponding to PDSCH on SCells is received and PDSCH is received on the PCell in only one DL subframe where the DAI value is set to '1,' fall back to PUCCH format 1a/1b. The PUCCH format 1a/1b is transmitted on the SCell UL carrier.

For a FDD pSCell, if no (E)PDCCH corresponding to PDSCH on other cells in the PUCCH cell group is received and PDSCH is received on the pSCell, fall back to PUCCH format 1a/1b. The PUCCH format 1a/1b is transmitted on the SCell UL carrier.

For a TDD pSCell, if no (E)PDCCH corresponding to PDSCH on other cells in the PUCCH cell group is received and PDSCH is received on the pSCell in only one DL subframe where the DAI value is set to '1,' fall back to PUCCH format 1a/1b. The PUCCH format 1a/1b is transmitted on the SCell UL carrier.

Figure 15A:
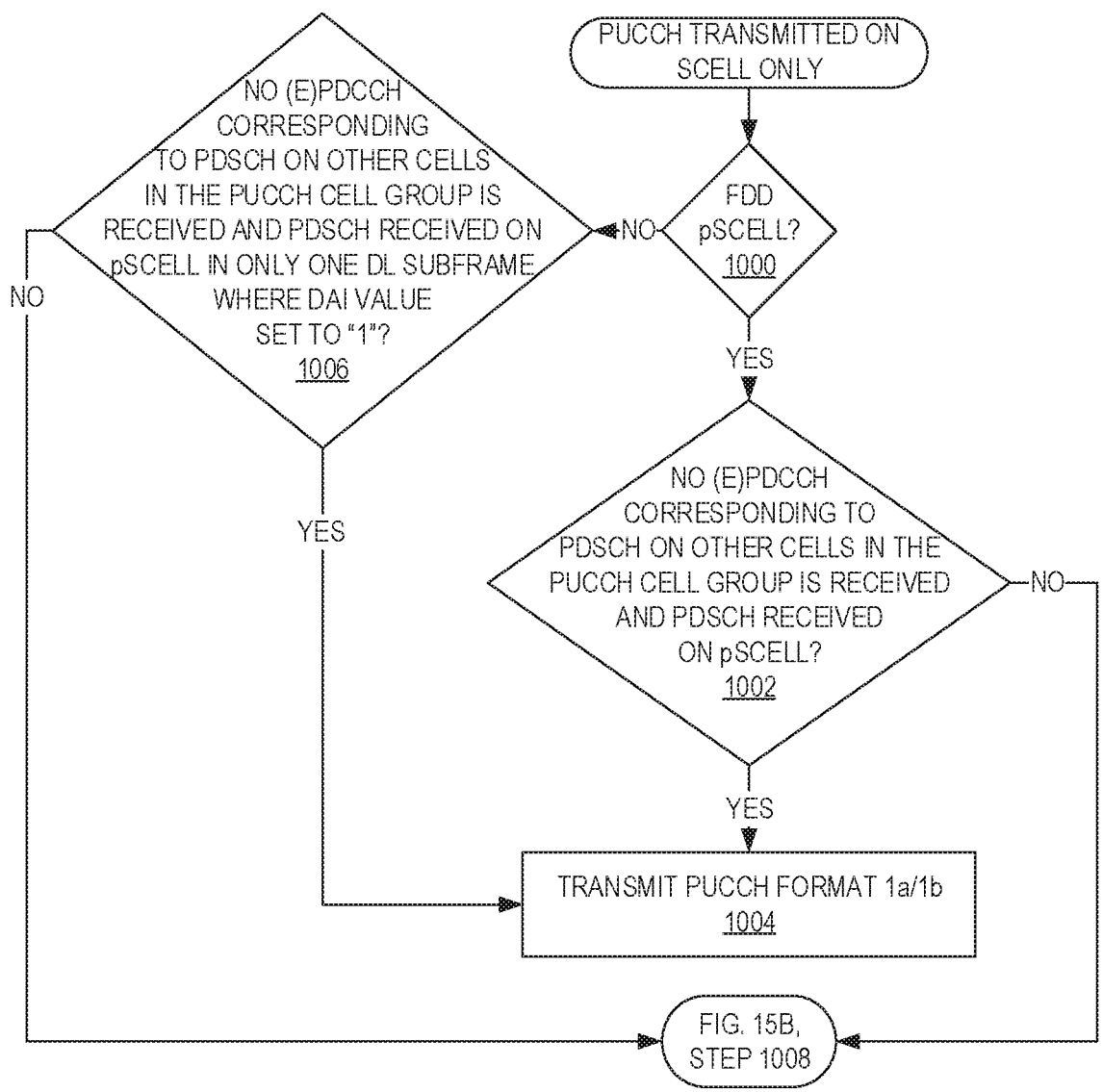
FIGS. 15A and 15B illustrate a fallback procedure performed by the wireless device for the new PUCCH format according to some other embodiments of the present disclosure.
Figure 15B:
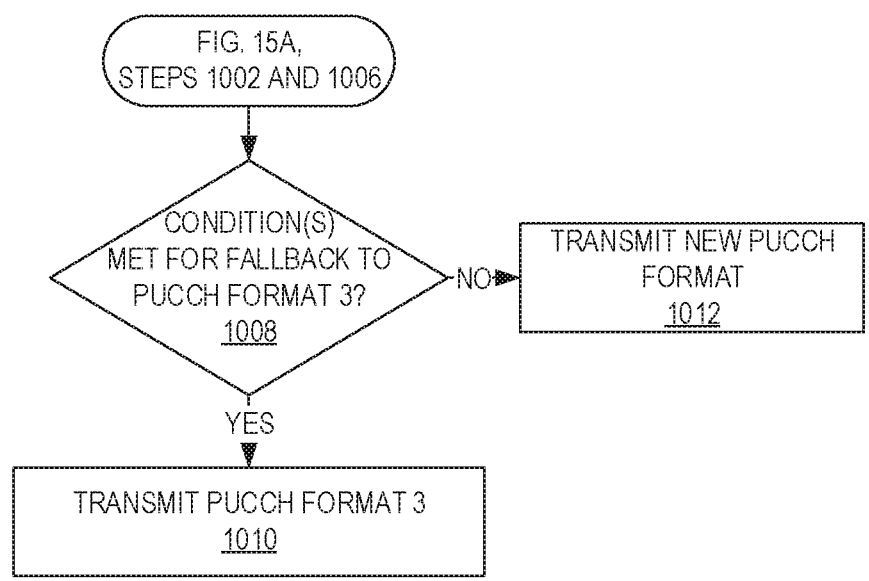

In this regard, FIGS. 15A and 15B illustrate a fallback procedure performed by the wireless device 16 according to some embodiments of the present disclosure. This fallback procedure implements the conditions for fallback to PUCCH format 1a/1b provided above. As illustrated, PUCCH is transmitted on an SCell only. In order to determine whether PUCCH format 4 should fallback to some other PUCCH format, the wireless device 16 determines whether the pSCell, which in this case is one of the SCells 14 of the wireless device 16, for a PUCCH cell group for such a PUCCH transmission is desired is on an FDD carrier or a TDD carrier (step 1000). If the pSCell of the wireless device 16 is on an FDD carrier, the wireless device 16 determines whether: (a) the wireless device 16 has received no (E)PDCCH corresponding to PDSCH on any other SCells of the wireless device 16 in the PUCCH cell group and (b) the wireless device 16 has received a PDSCH on the pSCell of the PUCCH cell group (step 1002). If the conditions in step 1002 are true, then the wireless device 16 decides that fallback to PUCCH format 1a/1b is appropriate and, as such, transmits PUCCH according to format 1a/1b (step 1004).

Returning to step 1100, if the pSCell of the wireless device 16 for the PUCCH cell group is not an FDD cell (i.e., if the pSCell of the wireless device 16 is a TDD cell), the wireless device 16 determines whether: (a) the wireless device 16 has received no (E)PDCCH corresponding to PDSCH on any other SCell of the wireless device 16 in the PUCCH cell group and (b) the wireless device 16 has received a PDSCH on the pSCell in only one DL subframe where the DAI value is set to "1" (step 1006). If the conditions in step 1006 are true, then the wireless device 16 decides that fallback to PUCCH format 1a/1b is appropriate and, as such, transmits PUCCH according to format 1a/1b (step 1004).

If the conditions in step 1002 are false for a FDD pSCell or if the conditions in step 1006 are false for a TDD pSCell, the wireless device 16 determines whether one or more conditions for fallback to PUCCH format 3 are satisfied (step 1008). While any suitable conditions may be used, some example conditions for fallback to PUCCH format 3 for the case where PUCCH is transmitted on the PCell 14-1 are described below. If the condition(s) for fallback to PUCCH format 3 is satisfied, the wireless device 16 decides that fallback to PUCCH format 3 is appropriate and, as such, transmits PUCCH according to format 3 (step 1010). However, if the condition(s) for fallback to PUCCH format 3 is not satisfied, the wireless device 16 decides that fallback to PUCCH format 3 is not appropriate and, as such, transmits PUCCH according to the new format, which again is referred to herein as format 4 (step 1012).

PUCCH may fall back to PUCCH format 3 as described above in the section relating to PUCCH on both PCell and SCell.

V. System Operation and Wireless Device and Base Station Embodiments

Figure 16:
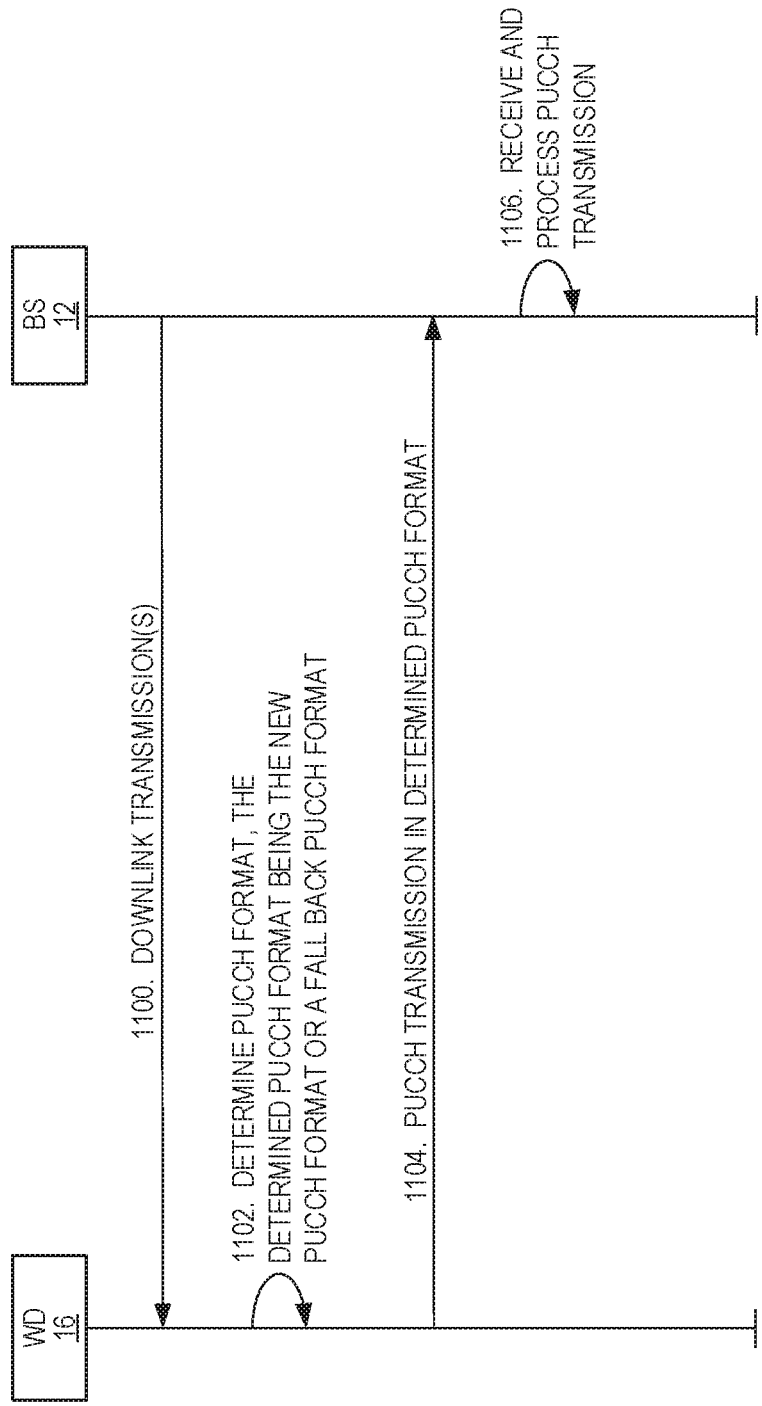
FIG. 16 illustrates the operation of the base station and the wireless device of FIG. 2 according to some embodiments of the present disclosure.

FIG. 16 illustrates the operation of the base station 12 and the wireless device 16 according to some embodiments of the present disclosure. As illustrated, the base station 12 transmits DL transmissions to the wireless device 16 (e.g., on PDSCH) on one or more cells (e.g., the PCell 14-1 and, in some cases, one or more of the SCells 14-2 through 14-32). The wireless device 16 determines the PUCCH format for a PUCCH transmission including HARQ-ACK(s) for the DL transmission(s) on the respective cell(s) (step 1102). The determined PUCCH format is either PUCCH format 4 or, if the wireless device 16 decides fallback is appropriate, PUCCH format 1a/1b or PUCCH format 3, as discussed above. The wireless device 16 transmits the PUCCH transmission in the determined PUCCH format on the appropriate cell (e.g., the PCell or the pSCell) (step 1104). The base station 12 receives and processes the PUCCH transmission, as will be understood by those of ordinary skill in the art (step 1106).

Figure 17:
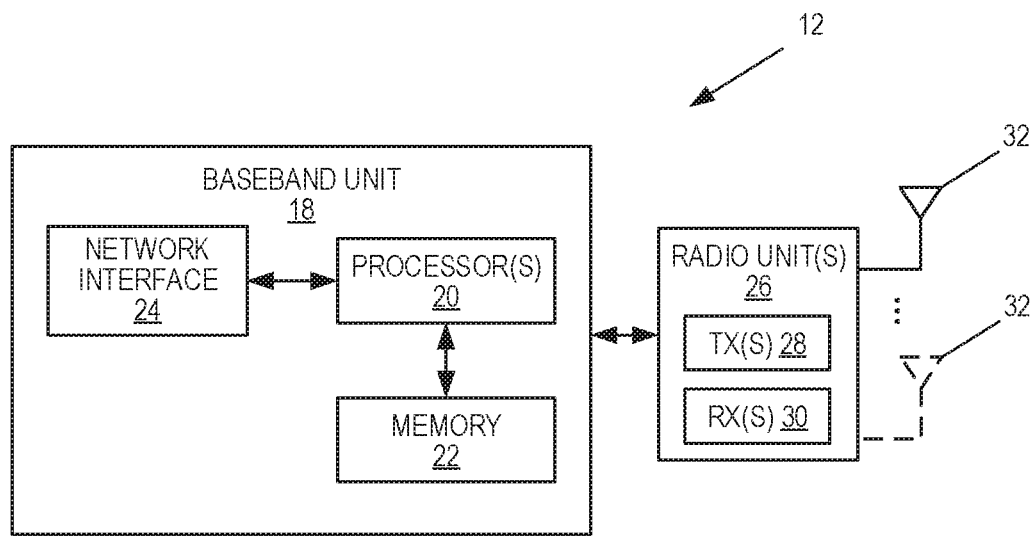
FIGS. 17 and 18 are schematic block diagrams of a base station according to some embodiments of the present disclosure.

FIG. 17 is a schematic block diagram of the base station 12 according to some embodiments of the present disclosure. This discussion is equally applicable to other types of radio access nodes. Further, other types of network nodes may have similar architectures (particularly with respect to including processor(s), memory, and a network interface). As illustrated, the base station 12 includes a baseband unit 18 that includes one or more processors 20 (e.g., Central Processing Units (CPUs), Application Specific Integrated Circuits (ASICs), Field Programmable Gate Arrays (FPGAs), and/or the like), memory 22, and a network interface 24 as well as one or more radio units 26 that each includes one transmitters 28 and one or more receivers 30 coupled to one or more antennas 32. In some embodiments, the functionality of the base station 12 (or more generally the functionality of a radio access node or more generally the functionality of a network node) described above may be fully or partially implemented in software that is, e.g., stored in the memory 22 and executed by the processor(s) 20.

In some embodiments, a computer program including instructions which, when executed by at least one processor, causes the at least one processor to carry out the functionality of the base station 12 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 18:
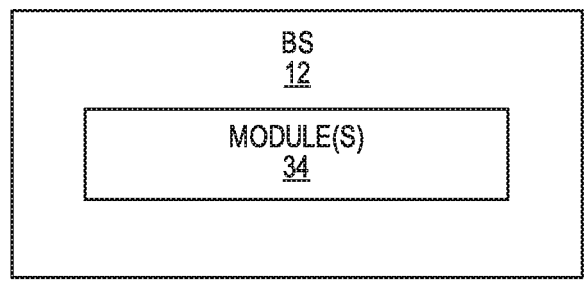

FIG. 18 is a schematic block diagram of the base station 12 according to some other embodiments of the present disclosure. The base station 12 includes one or more modules 34, each of which is implemented in software. The module(s) 34 provide the functionality of the base station 12 described herein. For example, the module(s) 34 may include one or more modules 34 to receive and processes PUCCH transmissions from the wireless device 16.

Figure 19:
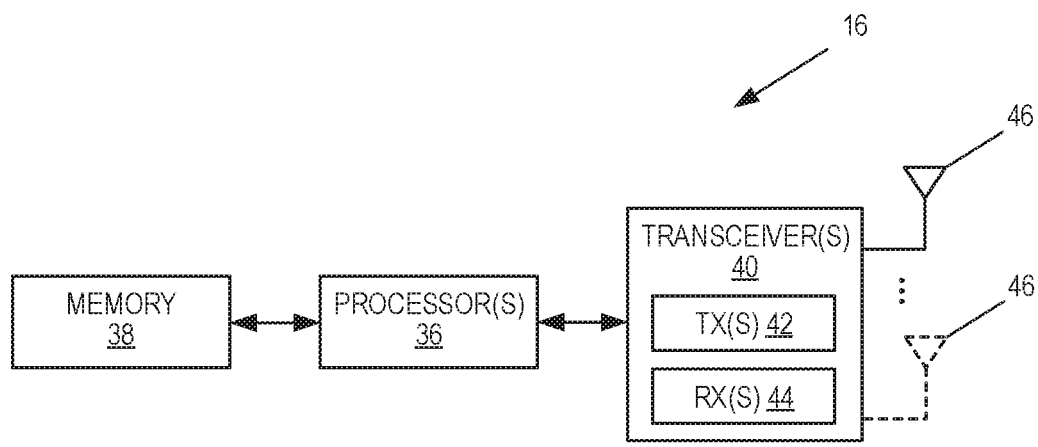
FIGS. 19 and 20 are schematic block diagrams of a wireless device according to some embodiments of the present disclosure.

FIG. 19 is a schematic block diagram of the wireless device 16 (e.g., a UE) according to some embodiments of the present disclosure. As illustrated, the wireless device 16 includes one or more processors 36 (e.g., CPUs, ASICs, FPGAs, and/or the like), memory 38, and one or more transceivers 40 each including one or more transmitter 42 and one or more receivers 44 coupled to one or more antennas 46. In some embodiments, the functionality of the wireless device 16 described above may be fully or partially implemented in software that is, e.g., stored in the memory 38 and executed by the processor(s) 36.

In some embodiments, a computer program including instructions which, when executed by at least one processor, causes the at least one processor to carry out the functionality of the wireless device 16 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 20:
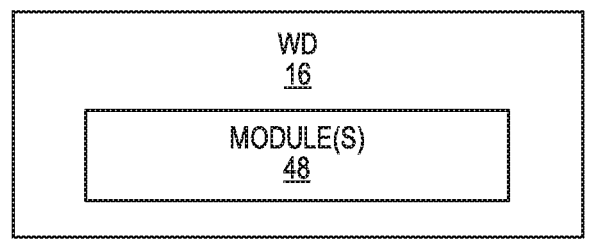

FIG. 20 is a schematic block diagram of the wireless device 16 according to some other embodiments of the present disclosure. The wireless device 16 includes one or more modules 48, each of which is implemented in software. The module(s) 48 provide the functionality of the wireless device 16 (e.g., UE) described herein. For example, the module(s) 48 include one or more transmit, or transmission, modules that operate to transmit (via an associated transmitter(s) of the wireless device 16) PUCCH transmissions according to the embodiments described herein. The module(s) 48 may further include a fallback module that operates to made fallback decisions for fallback of PUCCH format 4 to either PUCCH format 1a/1b or PUCCH format 3 according to the embodiments described herein.

The following acronyms are used throughout this disclosure.

3GPP Third Generation Partnership Project
5G Fifth Generation
ACK Acknowledgement
ASIC Application Specific Integrated Circuit
CA Carrier Aggregation
CC Component Carrier
CN Core Network
CPU Central Processing Unit
CSI Channel State Information
DAI Downlink Assignment Indicator
DCI Downlink Control Information
DL Downlink
DMRS Demodulation Reference Signal
eNB Enhanced or Evolved Node B
EPDCCH Enhanced Physical Downlink Control Channel
FDD Frequency Division Duplex
FPGA Field Programmable Gate Array
GHz Gigahertz
HARQ Hybrid Automatic Repeat Request
LAA Licensed Assisted Access
LTE Long Term Evolution
LTE-U Long Term Evolution in Unlicensed Spectrum
MHz Megahertz
MME Mobility Management Entity
MTC Machine Type Communication
NACK Negative Acknowledgment
OCC Orthogonal Cover Code
PCC Primary Component Carrier
PCell Primary Cell
PDCCH Physical Downlink Control Channel
PDN Packet Data Network
PDSCH Physical Downlink Shared Channel
P-GW Packet Data Network Gateway
PRB Physical Resource Block
pSCell Primary Secondary Cell
PUCCH Physical Uplink Control Channel
PUSCH Physical Uplink Shared Channel
RAN Radio Access Network
RE Resource Element
Rel-8 Release 8
Rel-10 Release 10
Rel-11 Release 11
Rel-12 Release 12
Rel-13 Release 13
SCC Secondary Component Carrier
SCEF Service Capability Exposure Function
SCell Secondary Cell
SR Scheduling Request
TBCC Tail-Biting Convolutional Code
TDD Time Division Duplex
TPC Transmit Power Control
UCI Uplink Control Information
UE User Equipment
UL Uplink
WLAN Wireless Local Area Network Those skilled in the art will recognize improvements and modifications to the embodiments of the present disclosure. All such improvements and modifications are considered within the scope of the concepts disclosed herein and the claims that follow.

What is claimed is:

1. A method of transmitting uplink control information for one or more carriers on an uplink control channel, the method performed by a wireless device in a cellular communications network comprising:

determining whether a first set of one or more conditions for a first uplink control channel format is satisfied, wherein the first uplink control channel format comprises Third Generation Partnership Project (3GPP) Physical Uplink Control Channel (PUCCH) format 1a/1b;

transmitting an uplink control channel transmission using the first uplink control channel format, when the first set of one or more conditions for the first uplink control channel format is determined to be satisfied;

determining whether a second set of one or more conditions for a second uplink control channel format is satisfied, when the first set of one or more conditions for the first uplink control channel format is determined to be not satisfied, wherein the second uplink control channel format comprises 3GPP PUCCH format 3;

transmitting the uplink control channel transmission using the second uplink control channel format, when the second set of one or more conditions for the second uplink control channel format is determined to be satisfied; and transmitting the uplink control channel transmission using a third uplink control channel format, when the second set of one or more conditions for the second uplink control channel format is determined to be not satisfied, wherein the third uplink control channel format has a maximum PUCCH capacity to support Hybrid Automatic Repeat Request Acknowledgment (HARQ-ACK) for thirty-two cells;

wherein transmitting the uplink control channel transmission comprises:

transmitting the uplink control channel transmission on a Frequency Division Duplexing (FDD) or Time Division Duplexing (TDD) Primary Cell (PCell) according to a carrier aggregation scheme in which the uplink control channel is transmitted on the PCell of the wireless device, wherein the second set of one or more conditions for fallback to format 3 comprises: (a) a condition that the wireless device receives a Physical Downlink Shared Channel (PDSCH) only on cells within a segmentation of less than or equal to a second threshold of feedback bits in a sequence of N possible feedback bits where the second threshold has an integer value greater than zero and where N is greater than the second threshold and (b) a condition that no downlink control channel is received by the wireless device on any other cells; or transmitting the uplink control channel transmission on a FDD or TDD Primary Secondary Cell (pSCell) in a cell group according to a carrier aggregation scheme in which the uplink control channel is transmitted on the pSCell, wherein the pSCell can be either a Primary Cell (PCell) of the wireless device or one of one or more Secondary Cells (SCells) of the wireless device, and wherein the second set of one or more conditions for fallback to format 3 comprises: (a) a condition that downlink shared channels are received by the wireless device on one or more SCells in a cell group that correspond to a segmentation of less than or equal to a second threshold of feedback bits in a sequence of N possible feedback bits, where the second threshold has an integer value greater than zero and where N is greater than the second threshold and (b) a condition that no downlink control channel is received by the wireless device on any other SCells in the cell group.

2. The method of claim 1 wherein:
the first set of one or more conditions for the first uplink control channel format comprises a condition that a required number of feedback bits for the uplink control channel transmission is less than or equal to a first threshold, the first threshold having an integer value greater than zero; and
the second threshold is greater than the first threshold.

3. The method of claim 2 wherein the first threshold is equal to 2 and the second threshold is equal to 22.

4. The method of claim 2 wherein the first set of one or more conditions for the first uplink control channel format further comprises a condition that feedback bits are required only for the PCell of the wireless device.

5. The method of claim 1 wherein transmitting the uplink control channel transmission comprises transmitting the uplink control channel transmission on the FDD PCell according to the carrier aggregation scheme in which the uplink control channel is transmitted on the FDD PCell of the wireless device, and wherein the first set of one or more conditions for fallback to format 1a/1b comprises: (a) a condition that no downlink control channel corresponding to a downlink shared channel on any SCells of the wireless device is received and (b) a condition that a downlink shared channel is received on the FDD PCell of the wireless device.

6. The method of claim 1 wherein transmitting the uplink control channel transmission comprises transmitting the uplink control channel transmission on the TDD PCell according to the carrier aggregation scheme in which the uplink control channel is transmitted on the TDD PCell of the wireless device, and wherein the first set of one or more conditions for fallback to format 1a/1b comprises: (a) a condition that no downlink control channel corresponding to a downlink shared channel on any SCells of the wireless device is received and (b) a condition that a downlink shared channel is received on the TDD PCell in only one downlink subframe where a Downlink Assignment Indicator (DAI) value is set to "1".

7. The method of claim 1 wherein transmitting the uplink control channel transmission comprises transmitting the uplink control channel transmission on the FDD or TDD PCell according to the carrier aggregation scheme in which the uplink control channel is transmitted on the PCell of the wireless device, and wherein the second set of one or more conditions for fallback to format 3 comprises: (a) the condition that the wireless device receives the PDSCH only on the cells within the segmentation of less than or equal to the second threshold of the feedback bits in the sequence of the N possible feedback bits and (b) the condition that no downlink control channel is received by the wireless device on any other cells.

8. The method of claim 7 wherein the second set of one or more conditions is determined by steps comprising:
obtaining each Component Carrier (CC) configuration and a capacity of PUCCH format 3;
selecting HARQ-ACK feedback bits to form the segmentation, a size of the segmentation is based on the obtained capacity of PUCCH format 3;
deciding CC and subframes associated with the formed segmentation based on information for the CC configurations and PUCCH configuration; and
deciding whether the PDSCH is received only on the cells within the formed segmentation of less than or equal to the second threshold number of feedback bits in the sequence of N possible feedback bits, and whether no downlink control channel is received on any other cells.

9. The method of claim 1 wherein transmitting the uplink control channel transmission comprises transmitting the uplink control channel transmission on the FDD pSCell in the cell group according to the carrier aggregation scheme in which the uplink control channel is transmitted on the FDD pSCell, where the FDD pSCell can be either the PCell of the wireless device or one of the one or more SCells of the wireless device, and wherein the first set of one or more conditions for fallback to format 1a/1b comprises: (a) a condition that no downlink control channel corresponding to a downlink shared channel on any SCells in the cell group is received and (b) a condition that a downlink shared channel is received on the FDD pSCell.

10. The method of claim 1 wherein transmitting the uplink control channel transmission comprises transmitting the uplink control channel transmission on the TDD pSCell in the cell group according to the carrier aggregation scheme in which the uplink control channel is transmitted on the TDD pSCell, where the TDD pSCell can be either the PCell (PCell) of the wireless device or one of the one or more SCells of the wireless device, and wherein the first set of one or more conditions for fallback to format 1a/1b comprises: (a) a condition that no downlink control channel corresponding to a downlink shared channel on any SCells in the cell group is received and (b) a condition that a downlink shared channel is received on the TDD pSCell in only one downlink subframe where a Downlink Assignment Indicator (DAI) value is set to "1".

11. The method of claim 1 wherein transmitting the uplink control channel transmission comprises transmitting the uplink control channel transmission on the FDD or TDD pSCell in the cell group according to the carrier aggregation scheme in which the uplink control channel is transmitted on the pSCell, where the pSCell can be either the PCell of the wireless device or one of the one or more SCells of the wireless device, and wherein the second set of one or more conditions for fallback to format 3 comprises: (a) the condition that the downlink shared channels are received by the wireless device on the one or more SCells in the cell group that correspond to the segmentation of less than or equal to the second threshold number of the feedback bits in the sequence of the N possible feedback bits, and (b) the condition that no downlink control channel is received by the wireless device on any other SCells in the cell group.

12. The method of claim 11 wherein the second set of one or more conditions is determined by steps comprising:
obtaining each Component Carrier (CC) configuration and a capacity of PUCCH format 3;
selecting HARQ-ACK feedback bits to form the segmentation, a size of the segmentation is based on the obtained capacity of PUCCH format 3;
deciding CC and subframes associated with the formed segmentation based on information for the CC configurations and PUCCH configuration; and
deciding whether the downlink shared channels are received on the one or more SCells in the cell group that correspond to the segmentation of less than or equal to the second threshold number of feedback bits in the sequence of the N possible feedback bits, and whether no downlink control channel is received on any other cells.

13. The method of claim 1 wherein transmitting the uplink control channel transmission comprises transmitting the uplink control channel transmission on the FDD pSCell according to the carrier aggregation scheme in which the uplink control channel is transmitted on the FDD pSCell, where the FDD pSCell is the PCell of the wireless device, and wherein the first set of one or more conditions for fallback to format 1a/1b comprises: (a) a condition that no downlink control channel corresponding to a downlink shared channel on any SCells in the cell group is received and (b) a condition that a downlink shared channel is received on the FDD pSCell.

14. The method of claim 1 wherein transmitting the uplink control channel transmission comprises transmitting the uplink control channel transmission on the TDD pSCell according to the carrier aggregation scheme in which the uplink control channel is transmitted on the TDD pSCell, where the TDD pSCell is the PCell of the wireless device, and wherein the first set of one or more conditions for fallback to format 1a/1b comprises: (a) a condition that no downlink control channel corresponding to a downlink shared channel on any SCells in the cell group is received and (b) a condition that a downlink shared channel is received on the TDD pSCell in only one downlink subframe where a Downlink Assignment Indicator (DAI) value is set to "1".

15. The method of claim 1 wherein transmitting the uplink control channel transmission comprises transmitting the uplink control channel transmission on the FDD pSCell according to the carrier aggregation scheme in which the uplink control channel is transmitted on the FDD pSCell, where the FDD pSCell is one SCell of the wireless device, and wherein the first set of one or more conditions for fallback to format 1a/1b comprises: (a) a condition that no downlink control channel corresponding to a downlink shared channel on the PCell and any other SCells in the cell group is received and (b) a condition that a downlink shared channel is received on the FDD pSCell.

16. The method of claim 1 wherein transmitting the uplink control channel transmission comprises transmitting the uplink control channel transmission on the TDD pSCell according to the carrier aggregation scheme in which the uplink control channel is transmitted on the TDD pSCell, where the TDD pSCell is one SCell of the wireless device, and wherein the first set of one or more conditions for fallback to format 1a/1b comprises: (a) a condition that no downlink control channel corresponding to a downlink shared channel on the PCell and any other SCells in the cell group is received and (b) a condition that a downlink shared channel is received on the TDD pSCell in only one downlink subframe where a Downlink Assignment Indicator (DAI) value is set to "1".

17. A wireless device enabled to operate in a cellular communications network to transmit uplink control information for one or more carriers on an uplink control channel, comprising:
one or more transmitters;
one or more processors; and
memory containing instructions that are executable by the one or more processors whereby the wireless device is operable to:
determine whether a first set of one or more conditions for a first uplink control channel format is satisfied, wherein the first uplink control channel format comprises Third Generation Partnership Project (3GPP) Physical Uplink Control Channel (PUCCH) format 1a/1b;
transmit, via the one or more transmitters, an uplink control channel transmission using the first uplink control channel format, when the first set of one or more conditions for the first uplink control channel format is determined to be satisfied;
determine whether a second set of one or more conditions for a second uplink control channel format is satisfied, when the first set of one or more conditions for the first uplink control channel format is determined to be not satisfied, wherein the second uplink control channel format comprises 3GPP PUCCH format 3;
transmit, via the one or more transmitters, the uplink control channel transmission using the second uplink control channel format, when the second set of one or more conditions for the second uplink control channel format is determined to be satisfied; and
transmit, via the one or more transmitters, the uplink control channel transmission using a third uplink control channel format, when the second set of one or more conditions for the second uplink control channel format is determined to be not satisfied, wherein the third uplink control channel format has a maximum PUCCH capacity to support Hybrid Automatic Repeat Request Acknowledgment (HARQ-ACK) for thirty-two cells;
wherein the wireless device operable to transmit the uplink control channel transmission comprises the wireless device operable to:
transmit the uplink control channel transmission on a Frequency Division Duplexing (FDD) or Time Division Duplexing (TDD) Primary Cell (PCell) according to a carrier aggregation scheme in which the uplink control channel is transmitted on the PCell of the wireless device, wherein the second set of one or more conditions for fallback to format 3 comprises: (a) a condition that the wireless device receives a Physical Downlink Shared Channel (PDSCH) only on cells within a segmentation of less than or equal to a second threshold of feedback bits in a sequence of N possible feedback bits where the second threshold has an integer value greater than zero and where N is greater than the second threshold and (b) a condition that no downlink control channel is received by the wireless device on any other cells; or transmit the uplink control channel transmission on a FDD or TDD Primary Secondary Cell (pSCell) in a cell group according to a carrier aggregation scheme in which the uplink control channel is transmitted on the pSCell, wherein the pSCell can be either a Primary Cell (PCell) of the wireless device or one of one or more Secondary Cells (SCells) of the wireless device, and wherein the second set of one or more conditions for fallback to format 3 comprises: (a) a condition that downlink shared channels are received by the wireless device on one or more SCells in a cell group that correspond to a segmentation of less than or equal to a second threshold of feedback bits in a sequence of N possible feedback bits, where the second threshold has an integer value greater than zero and where N is greater than the second threshold and (b) a condition that no downlink control channel is received by the wireless device on any other SCells in the cell group.

18. A non-transitory computer readable medium storing software instructions that when executed by one or more processors of a wireless device cause the wireless device to:

determine whether a first set of one or more conditions for a first uplink control channel format is satisfied, wherein the first uplink control channel format comprises Third Generation Partnership Project (3GPP) Physical Uplink Control Channel (PUCCH) format 1a/1b;

transmit, via one or more transmitters, an uplink control channel transmission using the first uplink control channel format, when the first set of one or more conditions for the first uplink control channel format is determined to be satisfied;

determine whether a second set of one or more conditions for a second uplink control channel format is satisfied, when the first set of one or more conditions for the first uplink control channel format is determined to be not satisfied, wherein the second uplink control channel format comprises 3GPP PUCCH format 3;

transmit, via the one or more transmitters, the uplink control channel transmission using the second uplink control channel format, when the second set of one or more conditions for the second uplink control channel format is determined to be satisfied; and transmit, via the one or more transmitters, the uplink control channel transmission using a third uplink control channel format, when the second set of one or more conditions for the second uplink control channel format is determined to be not satisfied, wherein the third uplink control channel format has a maximum PUCCH capacity to support Hybrid Automatic Repeat Request Acknowledgment (HARQ-ACK) for thirty-two cells;

wherein causing the wireless device to transmit the uplink control channel transmission comprises causing the wireless device to:

transmit the uplink control channel transmission on a Frequency Division Duplexing (FDD) or Time Division Duplexing (TDD) Primary Cell (PCell) according to a carrier aggregation scheme in which the uplink control channel is transmitted on the PCell of the wireless device, wherein the second set of one or more conditions for fallback to format 3 comprises: (a) a condition that the wireless device receives a Physical Downlink Shared Channel (PDSCH) only on cells within a segmentation of less than or equal to a second threshold of feedback bits in a sequence of N possible feedback bits where the second threshold has an integer value greater than zero and where N is greater than the second threshold and (b) a condition that no downlink control channel is received by the wireless device on any other cells; or transmit the uplink control channel transmission on a FDD or TDD Primary Secondary Cell (pSCell) in a cell group according to a carrier aggregation scheme in which the uplink control channel is transmitted on the pSCell, wherein the pSCell can be either a Primary Cell (PCell) of the wireless device or one of one or more Secondary Cells (SCells) of the wireless device, and wherein the second set of one or more conditions for fallback to format 3 comprises: (a) a condition that downlink shared channels are received by the wireless device on one or more SCells in a cell group that correspond to a segmentation of less than or equal to a second threshold of feedback bits in a sequence of N possible feedback bits, where the second threshold has an integer value greater than zero and where N is greater than the second threshold and (b) a condition that no downlink control channel is received by the wireless device on any other SCells in the cell group.

* * * * *